US010144490B2

(12) United States Patent
Taylor

(10) Patent No.: US 10,144,490 B2
(45) Date of Patent: Dec. 4, 2018

(54) APPARATUS FOR AND METHOD OF TRANSFERRING AN OBJECT BETWEEN A MARINE TRANSPORT VESSEL AND A CONSTRUCTION OR VESSEL

(71) Applicant: Limpet Holdings (UK) Limited, Edinburgh (GB)

(72) Inventor: David Kennedy Taylor, Edinburgh (GB)

(73) Assignee: Limpet Holdings (UK) Limited, Edinburgh (GB)

( * ) Notice: Subject to any disclaimer, the term of this patent is extended or adjusted under 35 U.S.C. 154(b) by 0 days.

(21) Appl. No.: 14/766,324

(22) PCT Filed: Feb. 19, 2014

(86) PCT No.: PCT/GB2014/050483
§ 371 (c)(1),
(2) Date: Aug. 6, 2015

(87) PCT Pub. No.: WO2014/128459
PCT Pub. Date: Aug. 28, 2014

(65) Prior Publication Data
US 2015/0375831 A1    Dec. 31, 2015

(30) Foreign Application Priority Data
Feb. 21, 2013    (GB) .................................. 1303031.7

(51) Int. Cl.
*B65G 67/60*    (2006.01)
*B63B 27/30*    (2006.01)
(Continued)

(52) U.S. Cl.
CPC .............. *B63B 27/30* (2013.01); *B63B 27/18* (2013.01); *B65G 67/603* (2013.01); *B65G 67/62* (2013.01);
(Continued)

(58) Field of Classification Search
CPC .......... B66C 13/02; B66D 1/52; Y10S 254/90; B66B 9/00
(Continued)

(56) References Cited

U.S. PATENT DOCUMENTS 2,328,094 A  *  8/1943  Perry ...................... B63B 23/18
                                                                    114/373
2,876,919 A  *  3/1959  True ......................... B66B 9/00
                                                                    187/245
(Continued)

FOREIGN PATENT DOCUMENTS

DE    102011109157 A1    2/2013
JP    S56110093 U    8/1981
(Continued)

OTHER PUBLICATIONS

Van Rooij, Michael, "International Search Report," prepared for PCT/GB2014/050483, dated May 23, 2014, four pages.

*Primary Examiner* — Gregory W Adams
(74) *Attorney, Agent, or Firm* — Winstead PC

(57) ABSTRACT

The present invention relates to an apparatus for transferring an object from or to a marine transport vessel to or from a construction or vessel. The apparatus comprises a motive force generator; a motive force applicator operably linked to the motive force generator; and, in use of the apparatus, adapted to be operably linked to an object to which the motive force applicator applies a motive force; a fastening device for operably linking the motive force applicator to the object; a control mechanism; said control mechanism being formed and arranged so as to control the motive force generator and is operable to switch the operation of the motive force generator into an ascent or descent mode wherein the motive force generator acts upon the motive force applicator; and a measuring device operably linked to the control mechanism, said measuring device comprising
(Continued)

one or more sensors and adapted to determine a distance between said measuring device and at least one point of a surface of a marine transport vessel from or to which said object is to be transferred wherein said apparatus further comprises one or more safety protocols and a parameter sensing means, said control mechanism being in communication with said parameter sensing means and responsive to feedback from said parameter sensing means, and adapted to initiate said one or more safety protocols.

24 Claims, 16 Drawing Sheets

(51) Int. Cl.
  *B65G 67/62* (2006.01)
  *E01D 15/24* (2006.01)
  *B63B 27/18* (2006.01)
(52) U.S. Cl.
  CPC ...... *E01D 15/24* (2013.01); *B66D 2700/0108* (2013.01); *Y10S 254/90* (2013.01)
(58) Field of Classification Search
  USPC ...... 114/230.12, 230.27, 258, 362, 368, 372, 114/373; 182/142, 148, 245, 262, 36, 182/406; 254/900; 414/137.2, 137.7, 414/137.9, 138.1–138.4, 139.5–139.7
  See application file for complete search history.

(56) References Cited

U.S. PATENT DOCUMENTS

| | | | | |
|---|---|---|---|---|
| 3,064,829 A * | 11/1962 | Hove | ........................ | B66B 9/00 187/404 |
| 3,341,035 A * | 9/1967 | Black | ........................ | B63B 3/54 212/299 |
| 3,596,070 A * | 7/1971 | McCool | .................. | B66C 13/23 114/245 |
| 3,624,783 A * | 11/1971 | Chang | ..................... | B66C 13/02 254/275 |
| 3,753,552 A * | 8/1973 | Barron | ..................... | B66D 1/52 137/82 |
| 3,804,268 A | 4/1974 | Barron et al. | | |
| 4,118,012 A * | 10/1978 | Kerr | ........................ | B66D 1/52 212/272 |
| 4,132,387 A * | 1/1979 | Somerville | ............. | B66D 1/52 254/340 |
| 4,147,330 A * | 4/1979 | Eik | ........................ | B66D 1/52 254/266 |
| 4,304,337 A * | 12/1981 | Dummer | ................. | B66D 1/52 212/308 |
| 4,396,094 A * | 8/1983 | Charlton | .................. | A62B 1/02 182/142 |
| 4,448,396 A * | 5/1984 | Delago | ..................... | B66D 1/52 254/340 |
| 4,547,857 A * | 10/1985 | Alexander | ............. | B66D 1/525 212/308 |
| 4,632,622 A * | 12/1986 | Robinson | ................ | B63B 27/18 212/76 |
| 4,658,934 A * | 4/1987 | Cooper | ..................... | B66B 9/04 187/254 |
| 4,932,541 A * | 6/1990 | Belsterling | ............. | B66C 13/02 212/271 |
| 5,160,286 A * | 11/1992 | Hill | ........................... | B63C 9/02 182/142 |
| 5,520,135 A * | 5/1996 | Rolland | .................. | B66C 13/02 114/210 |
| 5,827,037 A * | 10/1998 | Wilson, Jr. | .............. | B60P 1/445 414/540 |
| 5,938,183 A * | 8/1999 | Kissick | ..................... | B66D 1/14 254/266 |
| 6,309,160 B1 * | 10/2001 | Greene, Jr. | ............. | B63B 27/10 114/362 |
| 6,505,574 B1 | 1/2003 | Naud et al. | | |
| 6,536,743 B2 * | 3/2003 | Selcer | ..................... | B63B 21/66 254/333 |
| 6,904,864 B2 * | 6/2005 | Re | .......................... | B63B 23/40 114/368 |
| 7,063,306 B2 * | 6/2006 | Sanders | ................. | B66D 1/485 254/361 |
| 7,311,297 B1 * | 12/2007 | Bradshaw | ................ | B66D 3/18 254/271 |
| 7,618,223 B1 * | 11/2009 | Begley | .................... | A61G 3/063 114/362 |
| 2004/0118635 A1 * | 6/2004 | Sun | ........................... | A62B 1/06 182/142 |
| 2007/0158137 A1 * | 7/2007 | Petersen | .................. | E06C 7/186 182/8 |
| 2009/0127527 A1 * | 5/2009 | Hoffend, III | ............ | A63J 1/028 254/338 |
| 2009/0211846 A1 * | 8/2009 | Taylor | ................. | A63B 69/0048 182/231 |
| 2010/0054896 A1 * | 3/2010 | Lababidy | ............. | G01V 1/3843 414/137.7 |

FOREIGN PATENT DOCUMENTS

| | | | |
|---|---|---|---|
| JP | H0769276 A | 3/1995 | |
| JP | H0930484 A | 2/1997 | |
| NL | 1027103 C2 | 3/2006 | |
| WO | WO-2011019289 A1 | 2/2011 | |
| WO | WO 2011135310 A2 * | 11/2011 | ............ B66C 13/02 |
| WO | WO-2012161584 A1 | 11/2012 | |
| WO | WO-2014150950 A2 | 9/2014 | |

* cited by examiner

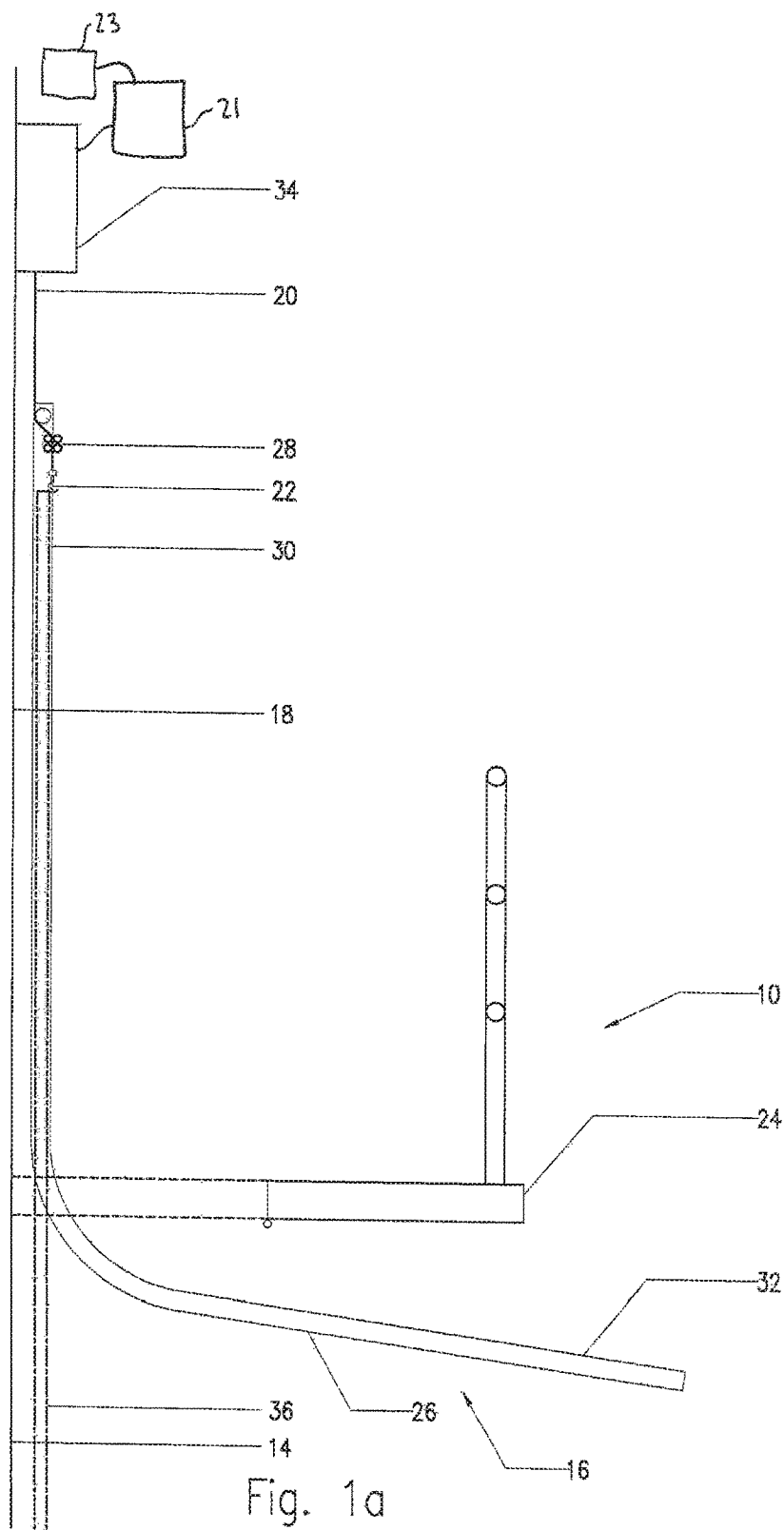

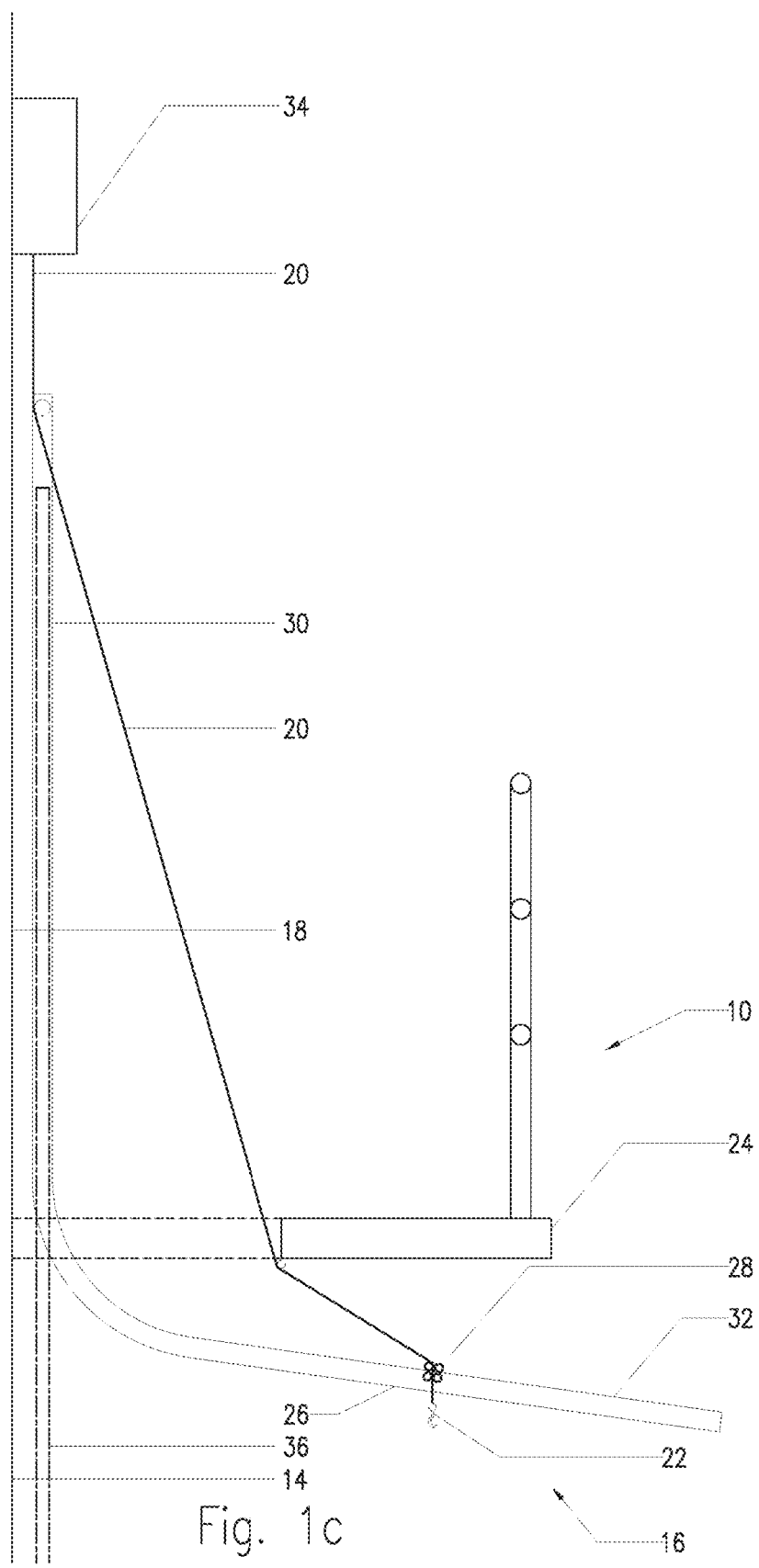

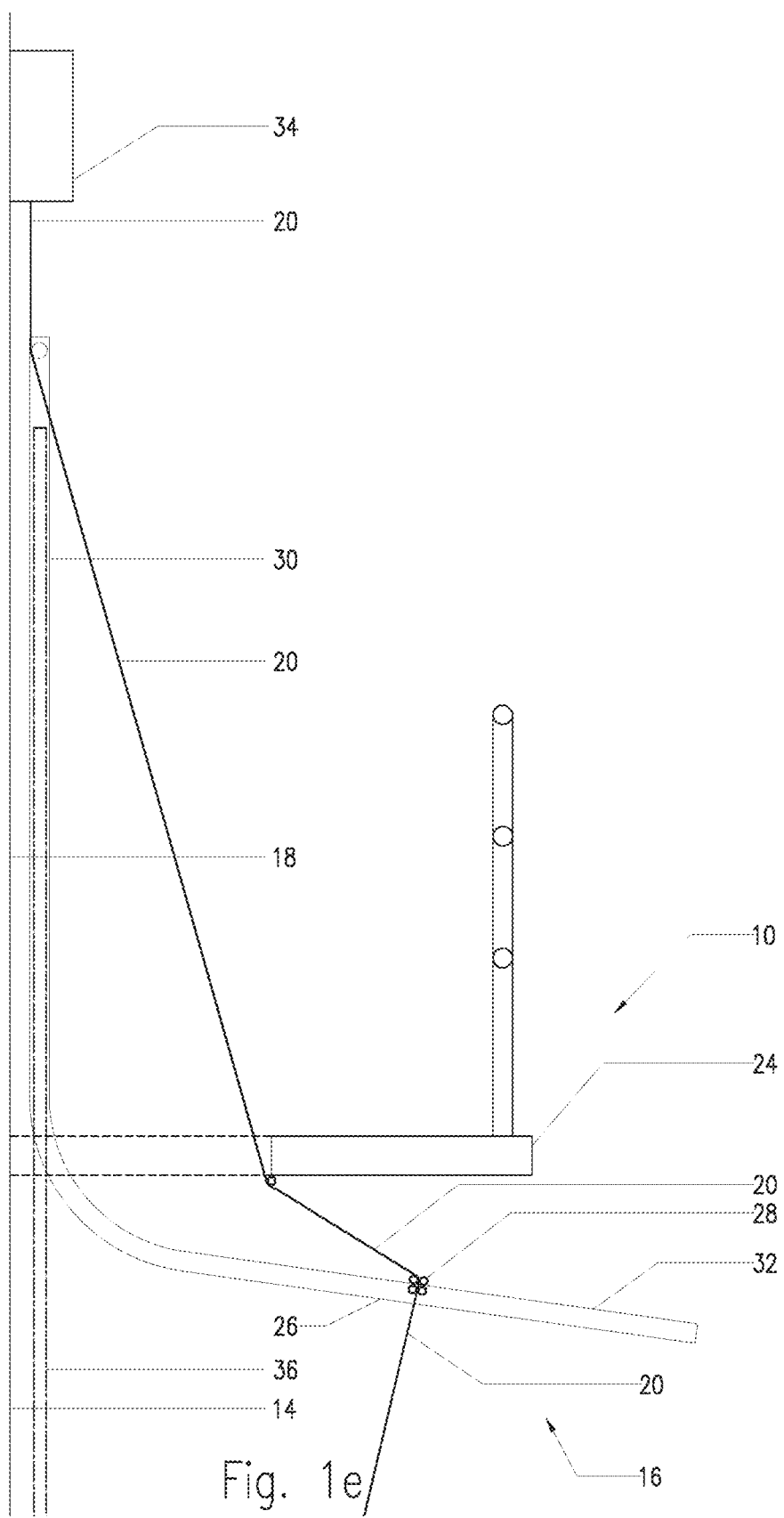

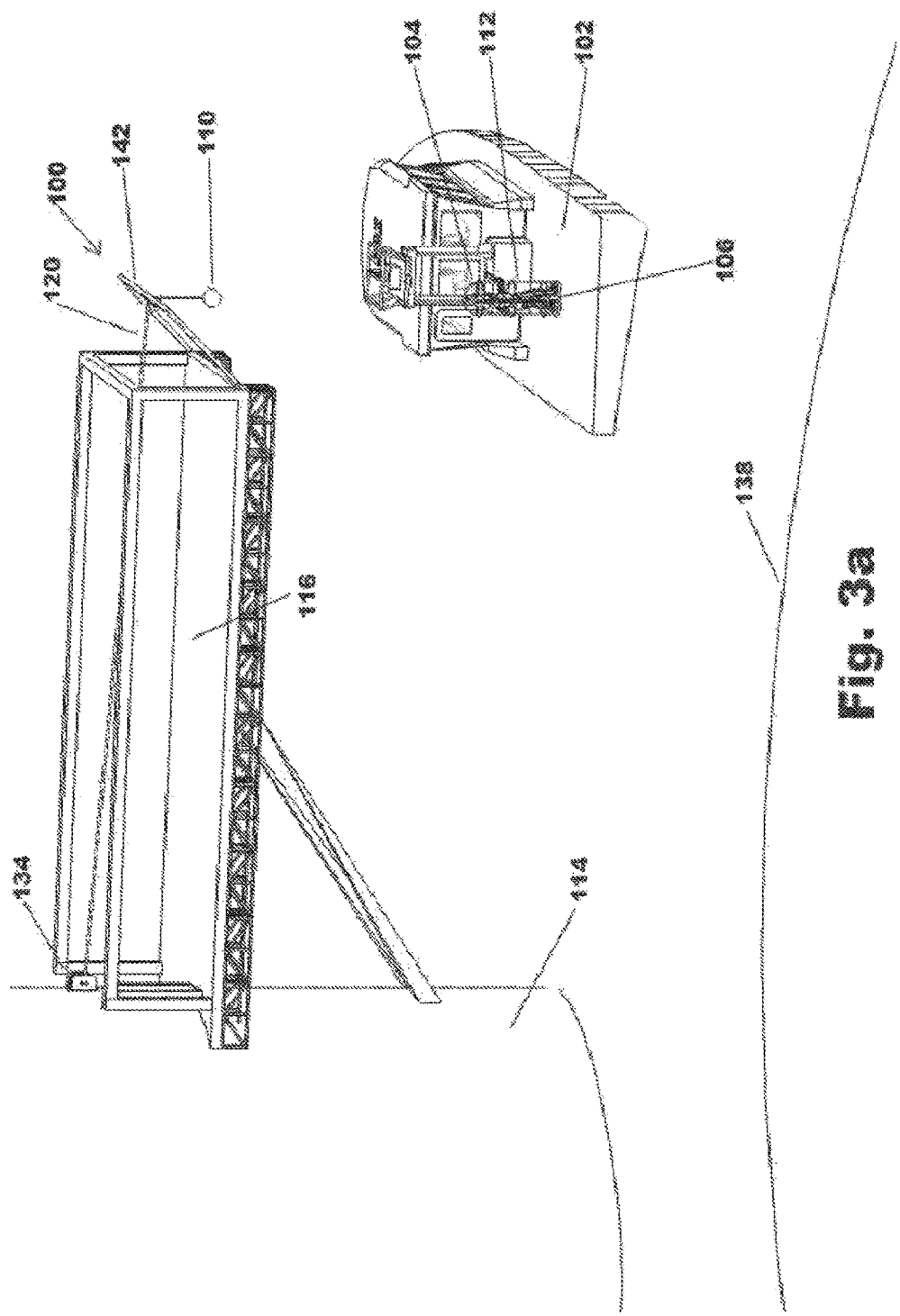

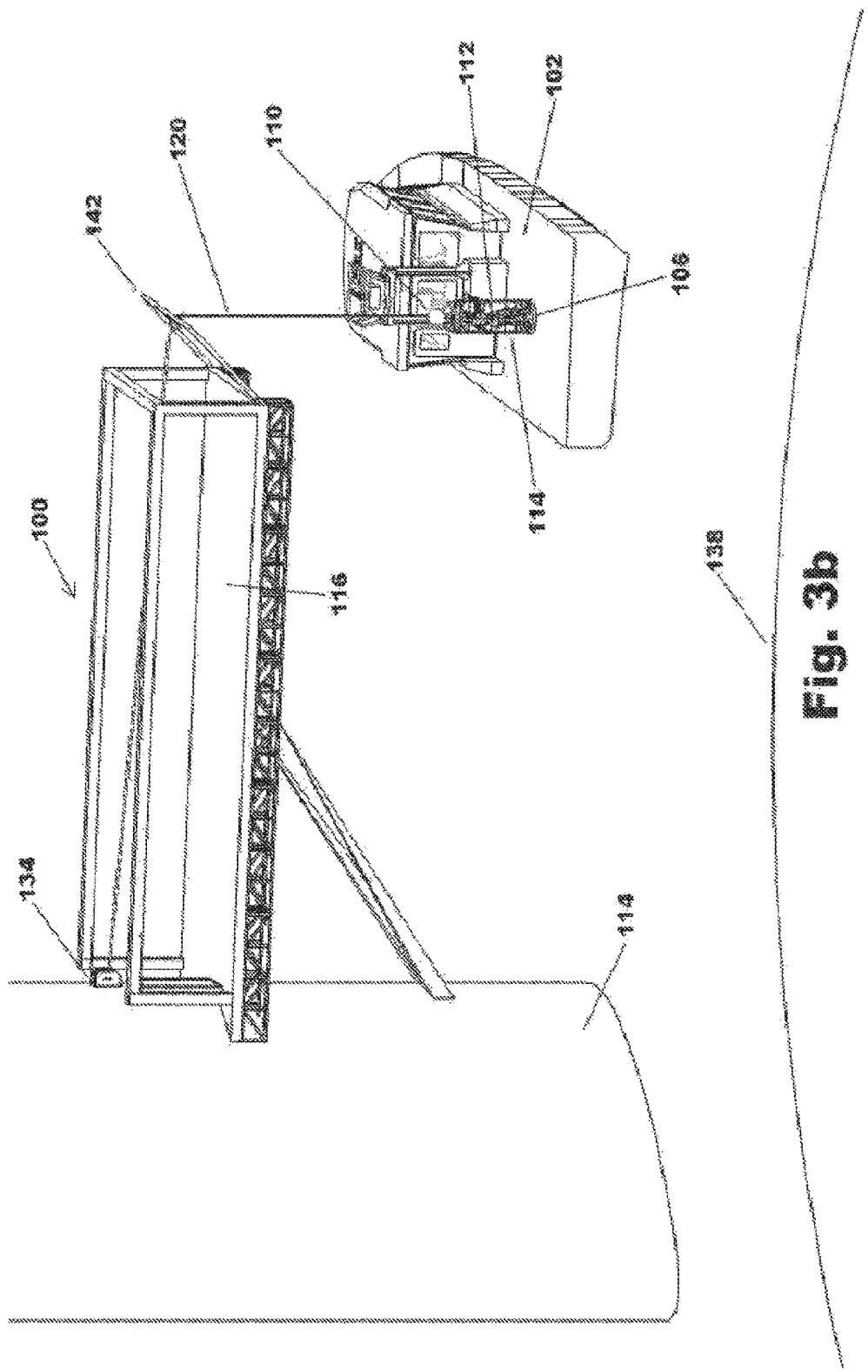

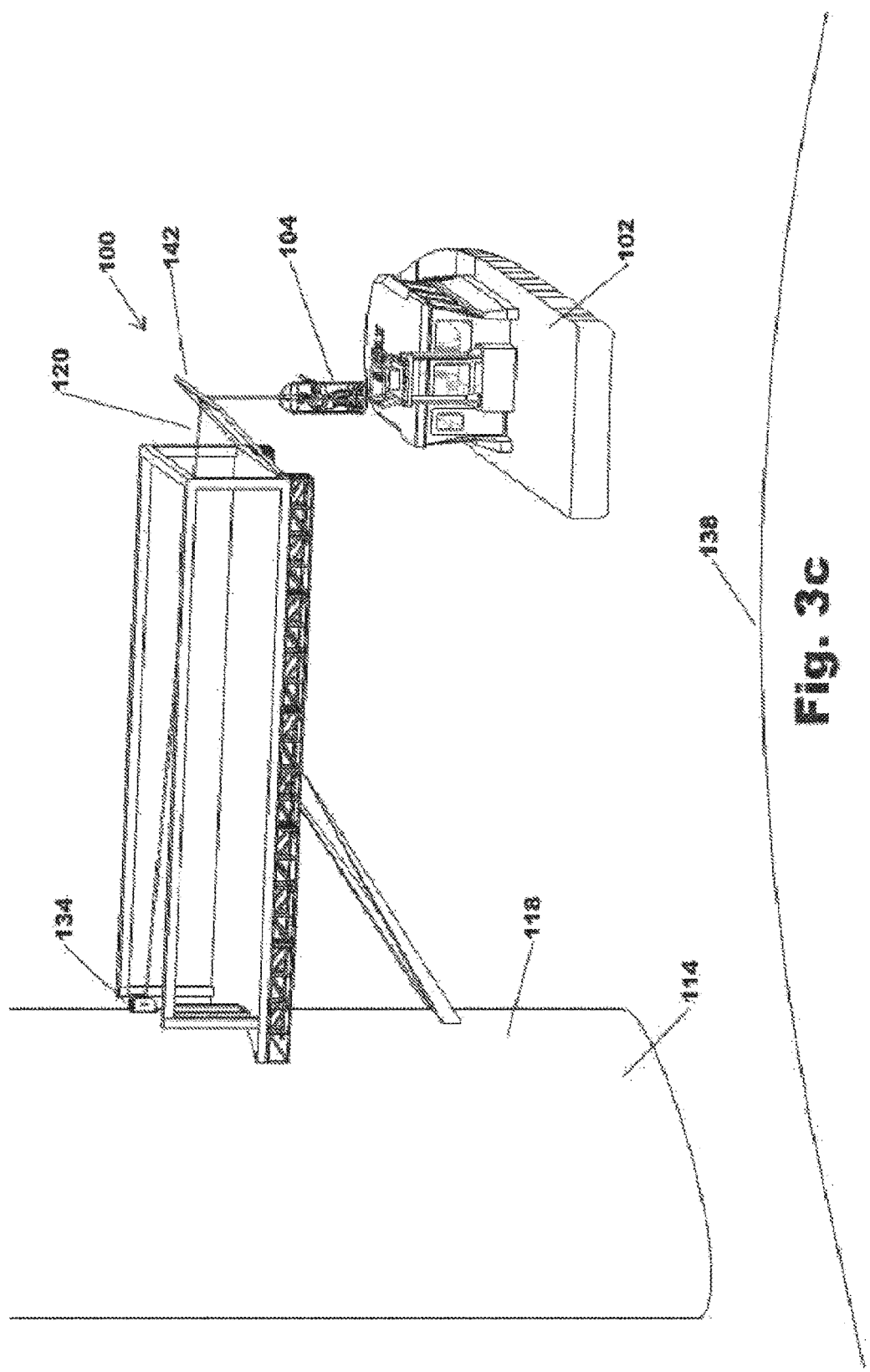

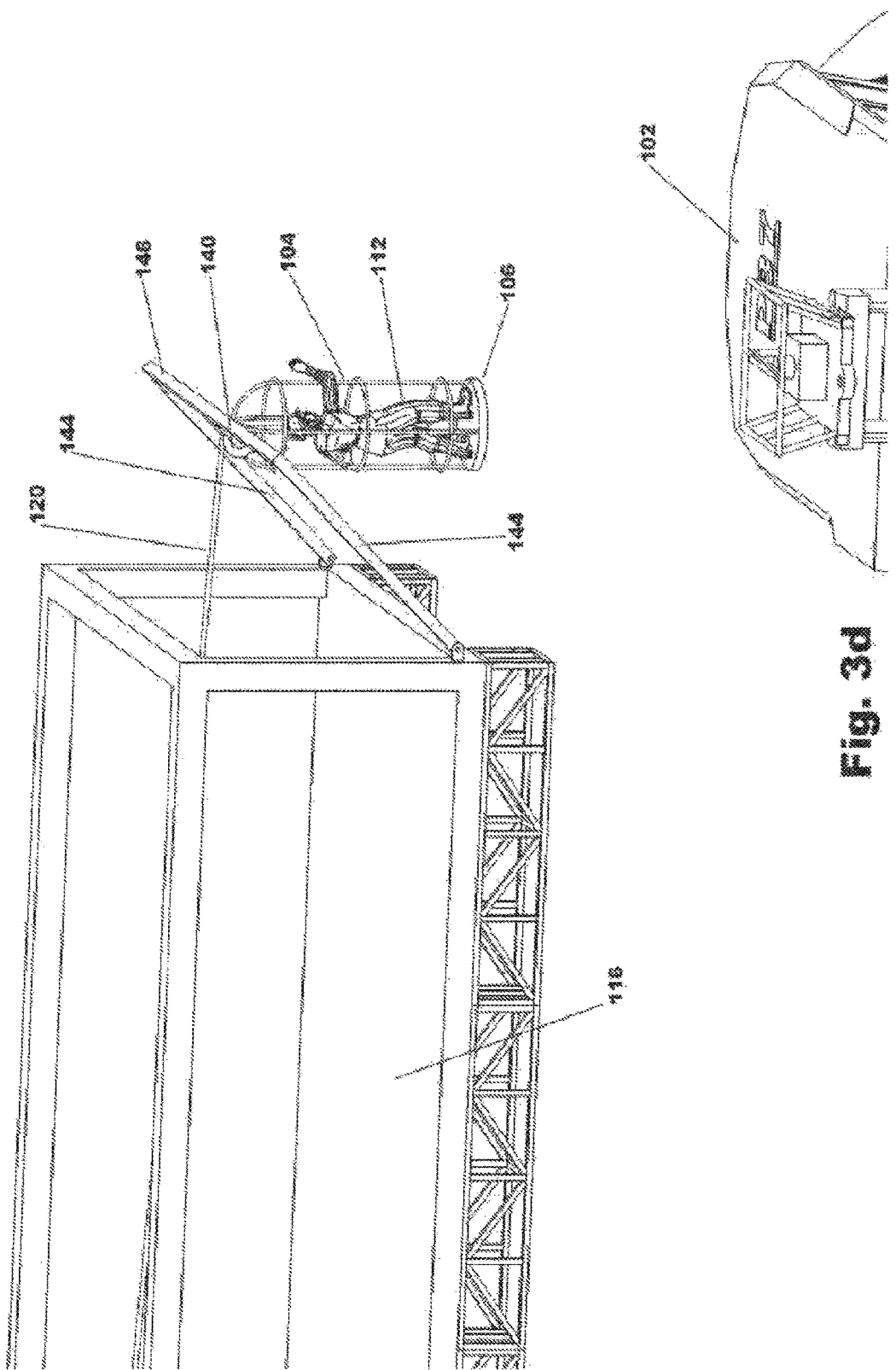

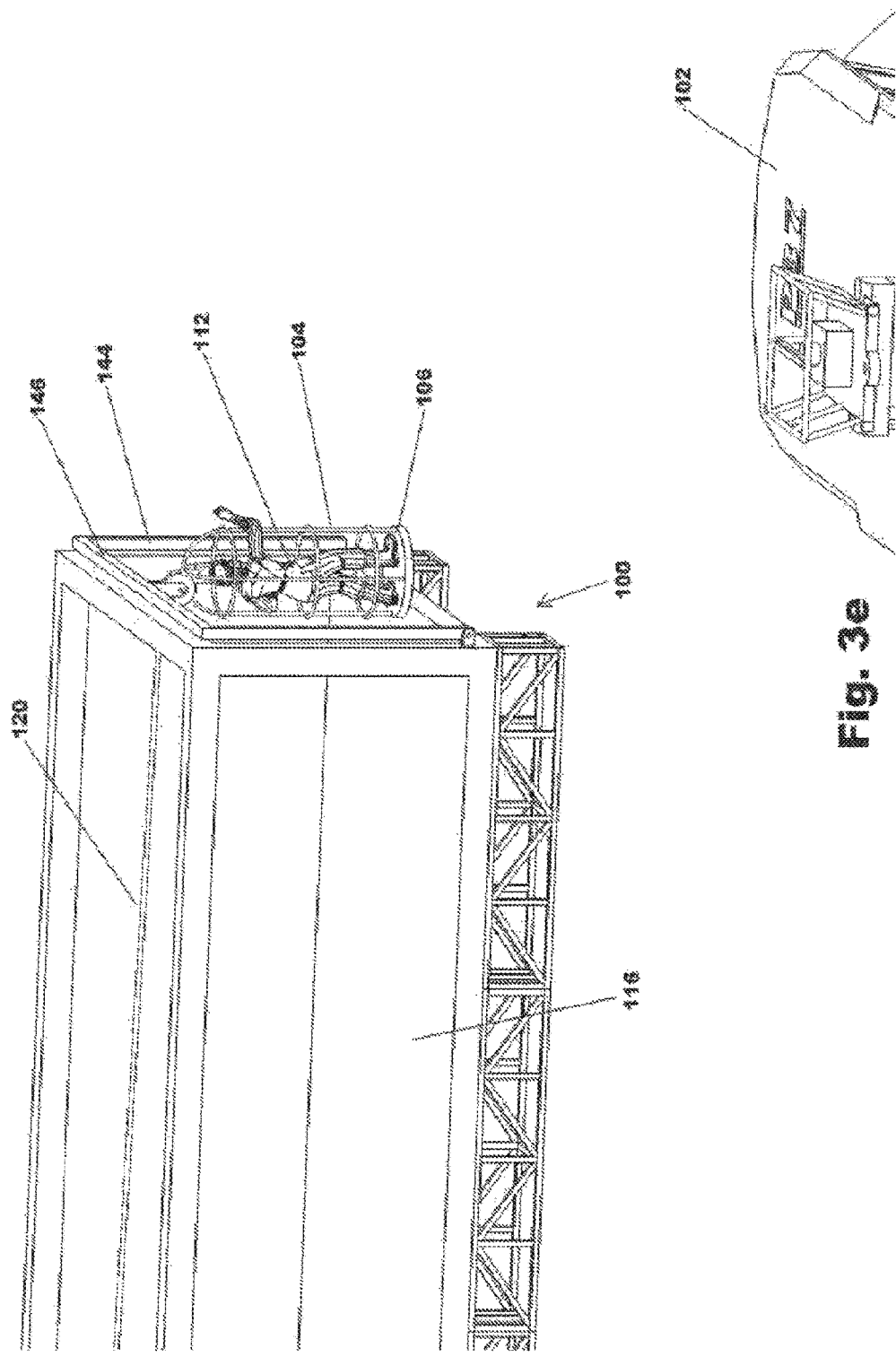

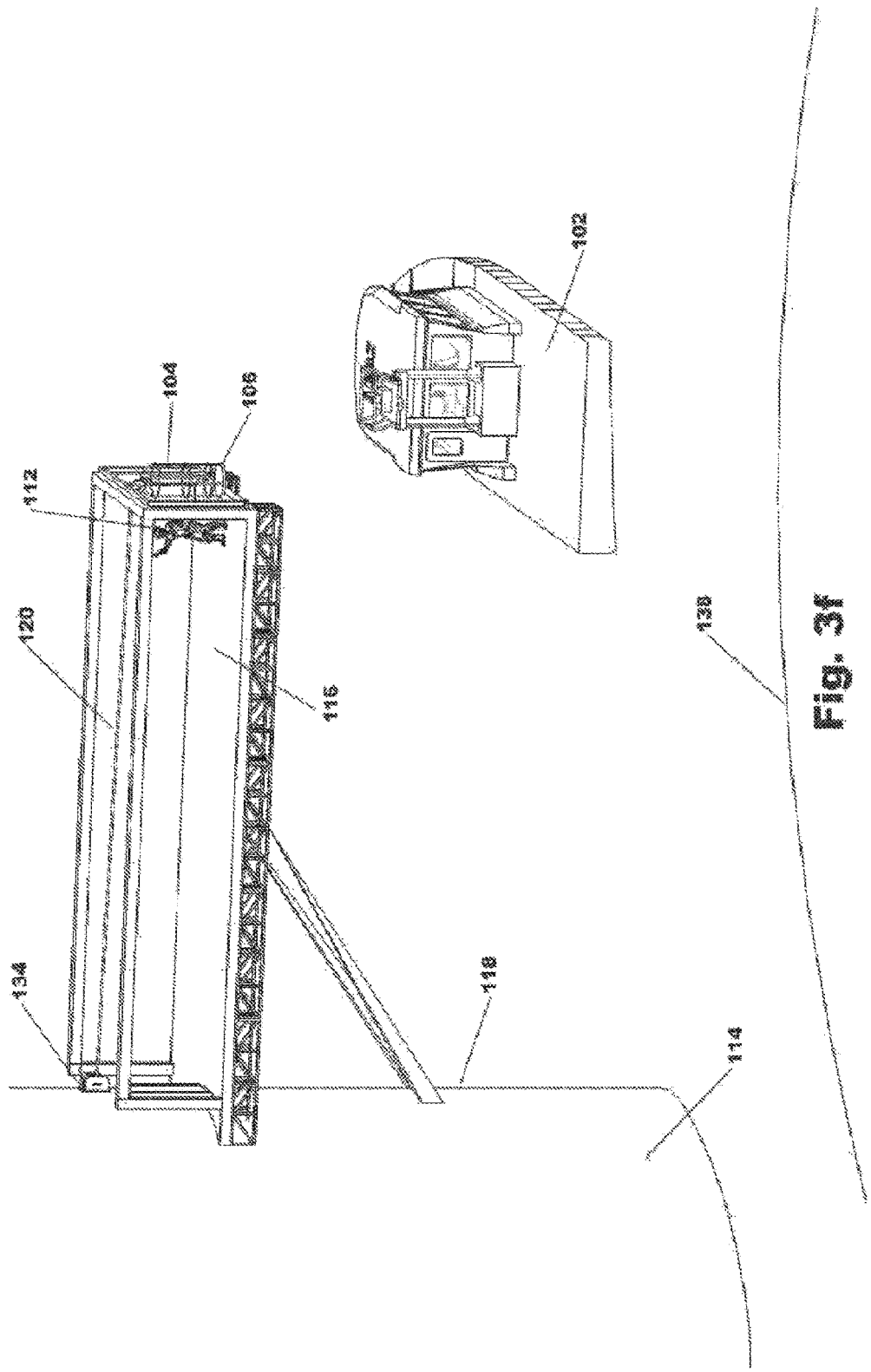

APPARATUS FOR AND METHOD OF TRANSFERRING AN OBJECT BETWEEN A MARINE TRANSPORT VESSEL AND A CONSTRUCTION OR VESSEL

FIELD OF INVENTION

The present invention relates to an improved apparatus for and method of access from a marine transport vessel, in particular but not limited to, an improved apparatus for and method of transferring an object from or to a marine transport vessel to or from a construction or vessel.

The present invention also relates to a marine transfer assembly for transferring an object between a marine transport vessel and a construction or vessel.

BACKGROUND

The transfer of personnel from a marine transport vessel such as a small boat to a large static construction or a large vessel is always problematic. The differential movement between the transfer and destination points creates a danger to personnel, particularly when access to the larger construction or vessel is in the form of a ladder.

The lighter the transport vessel/craft or the larger the waves, the more dangerous will be the transfer process. These problems are common to transfers from small transport vessels e.g. pilot boats to large tankers and containerships and to fixed constructions e.g. offshore turbines and gas and oil rigs.

There are a number of factors that define practical and safe transfers. Of these, the most obvious is wave size (amplitude) and speed. The higher and steeper the wave and the greater the frequency, the more dangerous the transfer. The smaller and the lighter the transport vessel, the greater the movement on the waves and the greater the volatility of the transport vessel movement.

At present, the wind turbine industry considers that a significant wave height of 1.5 meters represents the maximum safe conditions to allow the transfer of personnel onto offshore turbines. The fact that large Atlantic waves can routinely achieve a wave height of 6 meters shows how this factor limits access to offshore turbines. Oceanographic data shows that waves of up to 12 meters can be expected in Atlantic waters.

It is expected that turbines will be congregated in scores of structures. The offshore industry in the UK is so new and undeveloped that there is no certainty as to the type of marine transport vessel that will be required to provide access. There are the small fast transport vessels already providing access in the Thames Estuary, there are converted trawlers and there is the possibility of small fast inflatables launched from mother-vessels. The fact that offshore wind farms are generally expected to be built 20 to 40 km off the coast, and around 80 km off the coast for the UK round 3 wind farm sites, means that marine transport and access vessels will routinely experience harsh wave and tidal conditions. The industry is not developed enough to predict what will become the standard equipment and system of access for offshore waters.

What is certain is that the distance of the turbines offshore will require that transport vessels launched to access them must provide a high probability of achieving a successful delivery. The cost of aborting access programmes far offshore will be considerable. The types of transport vessels and the access mechanisms on the turbines will have to ensure a high success rate, even in the conditions to be anticipated in the North Sea and the near Atlantic.

Figures indicate that availability (i.e. the percentage of time that a turbine is ready to produce power if the wind is blowing) is lower for offshore turbines compared to onshore turbines. Onshore turbines have availability of approximately 98%, whereas many offshore turbines have availability of approximately 80-90%, due to maintenance time lost due to access restrictions. Lower availability levels are typically experienced in the winter months, when weather conditions are worse.

At present, most transport vessels delivering engineers to a turbine are driven hard into the large steel vertical tubes that are mounted on the turbine structure on either side of the access ladder. The captain maintains full throttle thus holding the bow of the transport vessel hard against the vertical tubes. With the bow pressed hard against the turbine and acting as the pivot for movement of the transport vessel, the larger the waves are the greater is the vertical movement of the stern. With a transport vessel 12 meters long, waves with a height of 4 meters would cause the transport vessel to adopt an inclination of 30 degrees to the horizontal. It is for this reason that transport vessels do not normally operate in a significant wave heights of greater than 1.5 meters.

With the transport vessel temporarily jammed in place the engineers can gain access to the ladder by stepping from the transport vessel to the ladder. At present, as the engineer stands on the bow of the transport vessel, he is able to pull down and clip himself onto the hook of an inertia reel device mounted on the access/work platform of the turbine. This device will catch him were he to fall. However, this device cannot differentiate between the downward plunge of the bow of the transport vessel with a fall by the engineer. If it detects a substantial downward movement it locks. This detaches the engineer from the deck of the descending transport vessel and into the air where he is vulnerable to a number of mishaps, including the possibility of being crushed between the transport vessel and the turbine. In addition, such equipment does not provide assistance in the climb up the ladder. Since engineers are dressed in heavy and cumbersome survival suits, this climb is laborious and potentially dangerous.

Some transport vessel operators in the industry contend that this "ramming technique" as currently practiced is damaging to both the transport vessels and the turbines. It is said that hulls and driving engines and gearboxes of transport vessels are damaged by the large pressures exerted upon them which they were never designed to resist. The same is true of the turbine structures themselves. As the industry moves into more difficult waters the attempt will be to achieve higher access percentages by the use of transport vessels with larger and larger horsepower. Ocean going tugs capable of developing 3000 HP are discussed as a solution. Applying such force to turbine structures is, it is thought probable, very likely to damage turbine foundations. As the industry moves into higher latitudes where wave heights and accelerations are far more substantial this policy of locking onto turbines using sheer force is likely to cause damage to transport vessels and turbine foundations.

Many solutions to the transfer problem have been proposed, from the technically extreme to the simple. The difficulty in achieving a completely satisfactory transfer method is evidenced by the fact that operators are considering the use of helicopters for the transfer of engineers despite a price tag of £5,000 per hour or more.

There is therefore a need for an improved method for the transfer of personnel between a marine transfer vessel such as a pilot boat and a larger construction such as a turbine, gas and oil rig, a larger offshore vessel, lighthouse or pier.

SUMMARY OF INVENTION

In a first aspect of the invention, there is provided an apparatus for transferring an object from or to a marine transport vessel to or from a construction or vessel, comprising:

a motive force generator;

a motive force applicator operably linked to the motive force generator; and, in use of the apparatus, adapted to be operably linked to an object to which the motive force applicator applies a motive force;

a fastening device for operably linking the motive force applicator to the object;

a control mechanism; said control mechanism being formed and arranged so as to control the motive force generator and is operable to switch the operation of the motive force generator into an ascent or descent mode wherein the motive force generator acts upon the motive force applicator; and a measuring device operably linked to the control mechanism, said measuring device comprising one or more sensors and adapted to determine a distance between said measuring device and at least one point of a surface of a marine transport vessel from or to which said object is to be transferred, wherein said apparatus further comprises one or more safety protocols and a parameter sensing means, said control mechanism being in communication with said parameter sensing means and responsive to feedback from said parameter sensing means, and adapted to initiate said one or more safety protocols.

Optionally, the measuring device is further adapted to determine an amplitude and a modulation of the vertical movement of said marine transport vessel resulting from waves acting on said marine transport vessel.

Optionally, the measuring device is further adapted to determine environmental conditions proximate a construction or vessel to which said object is transferred to or from.

The measuring device may determine a required parameter, such as the distance between said measuring device and at least one point on a surface of a marine transport vessel, in a number of different ways. For example, the measuring device may measure the parameter, calculate the parameter or perform both a calculation and measurement to determine the parameter.

Optionally, the fastening device comprises a carabiner.

Optionally, the control mechanism comprises a haulage force application means, said haulage force application means is operable to apply a determined haulage force to the motive force applicator by way of the motive force generator.

Preferably, the parameter sensing means comprises a load sensing means. The parameter sensing means may instead or further comprise one or more sensors or devices adapted to measure/determine an environmental parameter, internal or external parameter associated with the apparatus.

Optionally, the haulage force is determined in accordance with the equation hf equals dl multiplied by a, where: "hf" equals haulage force in kg; "dl" equals detected load (load detected by the load sensing means) in kg and "a" equals applied assistance as a percentage.

Optionally, the applied assistance "a" ranges from between 1% and 120%.

When an applied assistance of 100% or less is applied, the haulage force will provide a climb/ascent assistance to the object. When the assistance is greater than 100%, the haulage force will cause the apparatus to hoist the object without any ascent effort required by the object.

Optionally, the applied assistance "a" ranges from between 101% to 110%.

In an exemplary embodiment, the haulage force is up to a maximum of 300 kg equivalent. In an alternative exemplary embodiment, the haulage force may be greater than 300 kg equivalent.

Optionally, the haulage force application means is operable to determine the amount of haulage force applicable to a load in response to the detection of that load by the load sensing means.

Optionally, when the apparatus is an assisted ascent mode or a descent mode, the load sensing means is operable to detect a change in the load on the motive force applicator.

Optionally, when the apparatus is in an assisted ascent mode or descent mode and the load sensing means detects a change in the load on the motive force applicator, the control mechanism is operable to initiate a safety protocol and switch the operation of the motive force generator to an unassisted ascent mode wherein the motive force generator initially acts upon the motive force applicator until the load detected by the load sensing means is substantially equal to the weight of the motive force applicator and wherein the haulage force application means ceases to apply the haulage force to the motive force applicator by way of the motive force generator.

Optionally, the control mechanism, in use of the apparatus, is adapted to control the speed of the motive force generator in response to the determined distance between said measuring device and a surface of a marine transport vessel.

Optionally, the control mechanism, in use of the apparatus, is adapted to control the speed of the motive force generator in response to the determined amplitude and modulation of said marine transport vessel resulting from waves acting on said marine transport vessel.

In an exemplary embodiment, the speed of the motive force generator is controlled at a speed between 0.1 m/s and 5 m/s.

Optionally, the motive force generator comprises one or more of a powered winding reel, a hoist, a cable traction device, a capstan, a pulley, a counterweight device and/or a powered lifting device.

Optionally, the motive force applicator comprises a rope.

In an exemplary embodiment, the motive force generator is a powered winding reel and the motive force applicator is a rope, the rope being attached to the winding reel and, in use of the apparatus, attachable to said object via said fastening device.

Optionally, in embodiments wherein the motive force applicator comprises a rope, the rope is attached at one end to the motive force generator and to said fastening device at a distal portion along the rope.

Optionally, said object comprises a platform or cage.

Optionally, said object comprises a user.

Optionally, said object comprises equipment, tools or other inanimate object.

An apparatus according to the first aspect provides numerous advantages. For example, by determining a distance between said measuring device and a surface of a marine transport vessel, the apparatus of the invention is able to differentiate between situations where sudden movement of the engineer is due to a downward plunge of the bow of a marine transport vessel and where sudden movement of the engineer is due to a fall by the engineer. As such, one or more safety protocols may be initiated. For example, an operating mode to catch the fall of an engineer can be turned off where the sudden movement of the engineer is likely to be due to the downward plunge of the bow or not likely to be fatal. As a result, the risk of an engineer being unintentionally suspended in mid air due to a sudden descent in the bow of the transport vessel is reduced and thus not rendering him vulnerable to a number of mishaps, including the possibility of being crushed between the transport vessel and the turbine as may be the case with current transfer devices known in the art.

In addition, an apparatus according to the first aspect is operable to either provide climb assistance or hoist an engineer from a surface of a boat to a ladder and/or a work platform thus reducing the laborious effect of gaining access to the ladder and/or a work platform by an engineer dressed in a heavy and cumbersome survival suit.

According to a second aspect of the invention, there is provided a marine transfer assembly for transferring an object from/to a marine transport vessel to/from a construction or vessel, said assembly comprising:
an apparatus according to a first aspect of the invention; and
a structure adapted to extend from a side of a construction or vessel to or from which said object is to be transferred.

Optionally, said structure comprises a framework structure.

Optionally, the structure comprises a hoist rail and a trolley adapted to move along said rail.

Optionally, the trolley is operably linked to the motive force applicator and is adapted to move a position of the fastening device along said rail.

Optionally, the framework structure extends about 0.4 to 8 meters horizontally from the construction or vessel.

Optionally, the structure comprises a platform.

Optionally, in embodiments wherein the structure comprises a platform, the assembly further comprises a pulley operably linked to said motive force generator; and a pivotable frame attached to a distal end of said platform.

Optionally, said pivotable frame comprises two sidebars pivotally mounted on said platform and a crossbar positioned between said sidebars.

Optionally, said pulley is mounted on the crossbar of the pivotable frame.

Optionally, the platform, in use of the assembly, extends about 2 to 14 meters horizontally from the construction or vessel.

Optionally, the orientation of the structure is moveable between a first position and a second position.

Optionally, the position of the structure is adjustable relative to the construction or vessel.

According to a third aspect of the invention, there is provided a marine transfer assembly for transferring an object from/to a marine transport vessel to/from a construction or vessel, said assembly comprising:
an apparatus for transferring an object from or to a marine transport vessel to or from a construction or vessel, the apparatus comprising:
a motive force generator;
a motive force applicator operably linked to the motive force generator; and, in use of the apparatus, adapted to be operably linked to an object to which the motive force applicator applies a motive force;
a fastening device for operably linking the motive force applicator to an the object; and
a control mechanism; said control mechanism being formed and arranged so as to control the motive force generator and is operable to switch the operation of the motive force generator into an ascent or descent mode wherein the motive force generator acts upon the motive force applicator; and
a structure adapted to extend from a side of a construction or vessel to or from which said object is to be transferred, the structure comprising a framework structure having a hoist rail and a trolley adapted to move along said rail.

Preferably, the apparatus further comprises a measuring device operably linked to the control mechanism, said measuring device comprising one or more sensors and is adapted to determine a distance between said measuring device and at least one point of a surface of a marine transport vessel from or to which said object is to be transferred;

Preferably, the framework structure and trolley comprise similar features to the framework structure and trolley of the second aspect.

According to a fourth aspect of the invention, there is provided a method of transferring an object from a marine transport vessel to a construction or vessel, said method comprising the steps of:
determining an amplitude and a modulation of the vertical movement of said marine transport vessel resulting from waves acting on said marine transport vessel;
imputing said determined amplitude and modulation into a control mechanism of an apparatus for providing ascent assistant to said object;
sensing environmental and/or external parameters using a parameter sensing means in communication with the control mechanism, the parameter sensing means being configured to provide feedback to the control mechanism such that the control mechanism can determine whether to initiate one or more safety protocols;
communicating the sensed environmental and/or external parameters to the control mechanism;
initiating a motive force generator of said apparatus to actuate a motive force applicator at a speed based on said determined amplitude and modulation;
lowering a fastening device connected to a distal end of the motive force applicator to a pre-set distance relative to a surface of said marine transport vessel;
attaching said fastening device to said object;
applying ascent assistance to said object at a speed based on said determined amplitude and modulation.

Optionally, ascent assistance to said object is initiated at a crest of a wave.

Optionally, ascent assistance to said object is initiated proximate a crest of a wave.

Optionally, ascent assistance is applied at a speed of 4 m/s or less.

Optionally, the method further comprises the step of providing ascent assistance to the object to lift the object to a work platform on the construction or vessel.

According to a fifth aspect of the invention, there is provided a method of transferring an object to a marine transport vessel from an offshore structure or vessel, said method comprising the steps of:
determining an amplitude and a modulation of the vertical movement of said marine transport vessel resulting from waves acting on said marine transport vessel;

imputing said determined amplitude and modulation into a control mechanism of an apparatus for providing descent assistant to said object;

sensing environmental and/or external parameters using a parameter sensing means in communication with the control mechanism, the parameter sensing means being configured to provide feedback to the control mechanism such that the control mechanism can determine whether to initiate one or more safety protocols;

communicating the sensed environmental and/or external parameters to the control mechanism;

initiating a motive force generator of said apparatus to actuate a motive force applicator at a first speed based on said determined amplitude and modulation;

lowering said object to a pre-set distance relative to a surface of said marine transfer vessel at said first speed;

lowering said object onto the surface of the marine transport vessel at a second speed.

Optionally, the lowering of said object onto said surface of the marine transport vessel is initiated at a crest of a wave.

Optionally, the lowering of said object onto said surface of the marine transport vessel is initiated proximate a crest of a wave.

Optionally, the step of determining the amplitude and modulation is obtained by collecting data relating to the movement of the marine transport vessel due to wave pattern over a period of time.

Optionally, the collection of data involves performing data measurements approximately every half second over said period of time.

Optionally, the period of time is at least 5 seconds.

Optionally, the period of time is between 10 and 60 seconds.

Preferably, the collection of data is performed over a number of measuring cycles.

BRIEF DESCRIPTION OF FIGURES

There now follows a description of a preferred embodiment(s) of the invention, by way of non-limiting example, with reference being made to the accompanying drawings, in which:

FIGS. 1a to 1g show a first embodiment of a marine transfer assembly according to an aspect of the invention;

FIGS. 3a to 3f show a second embodiment of a marine transfer assembly according to an aspect of the invention.

DETAILED DESCRIPTION

Figure 1B:
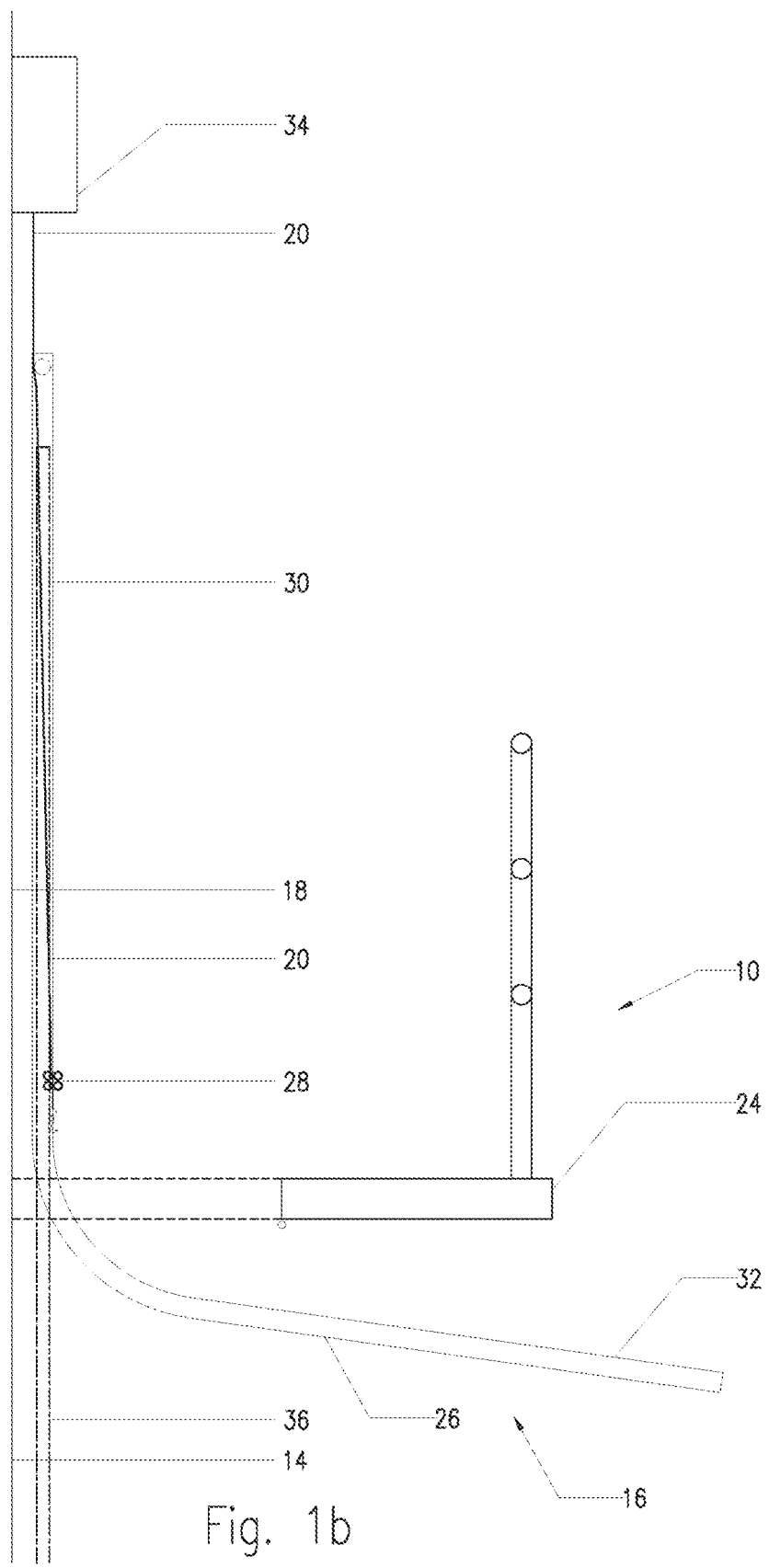
Figure 1D:
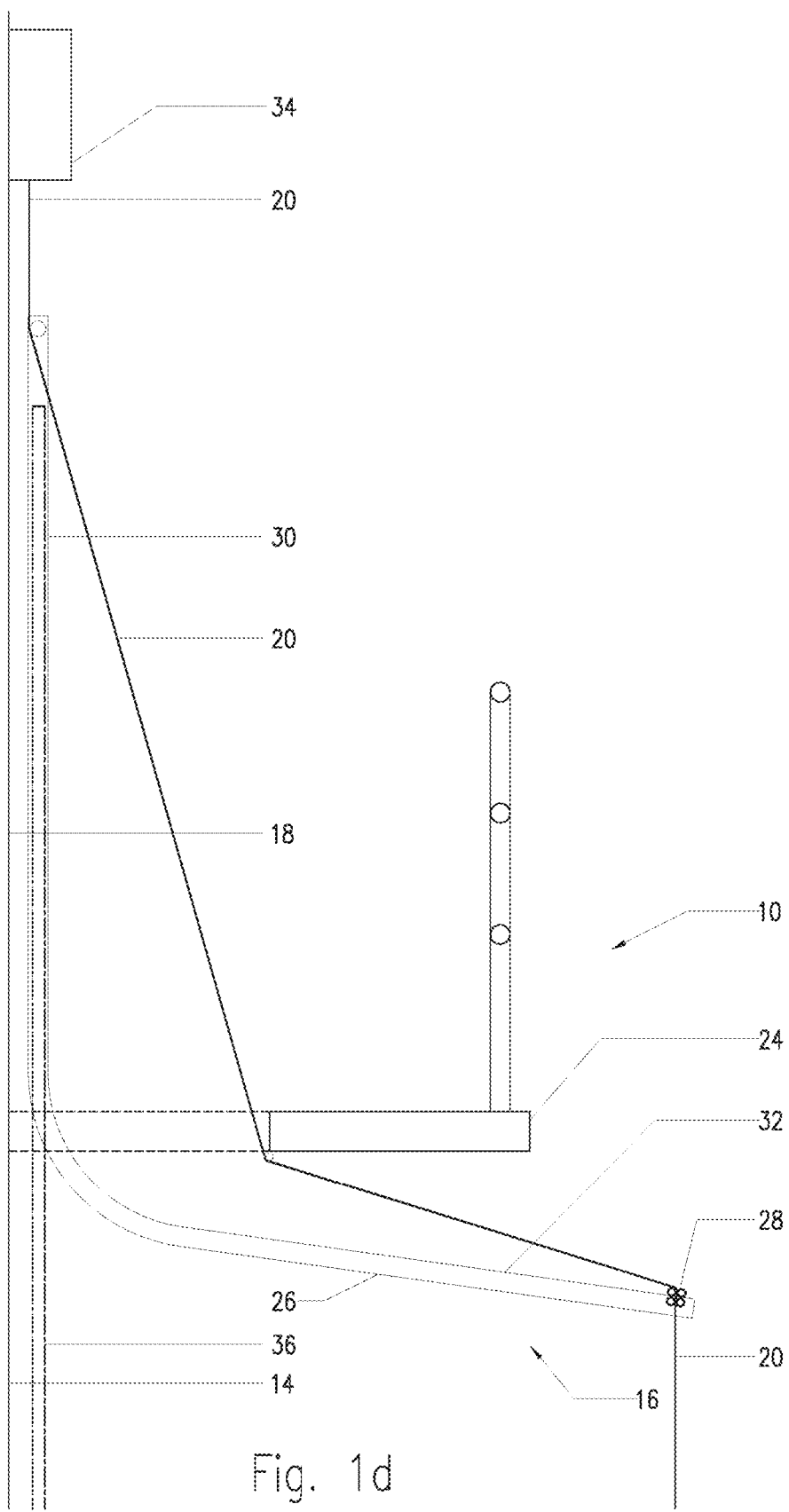
Figure 1F:
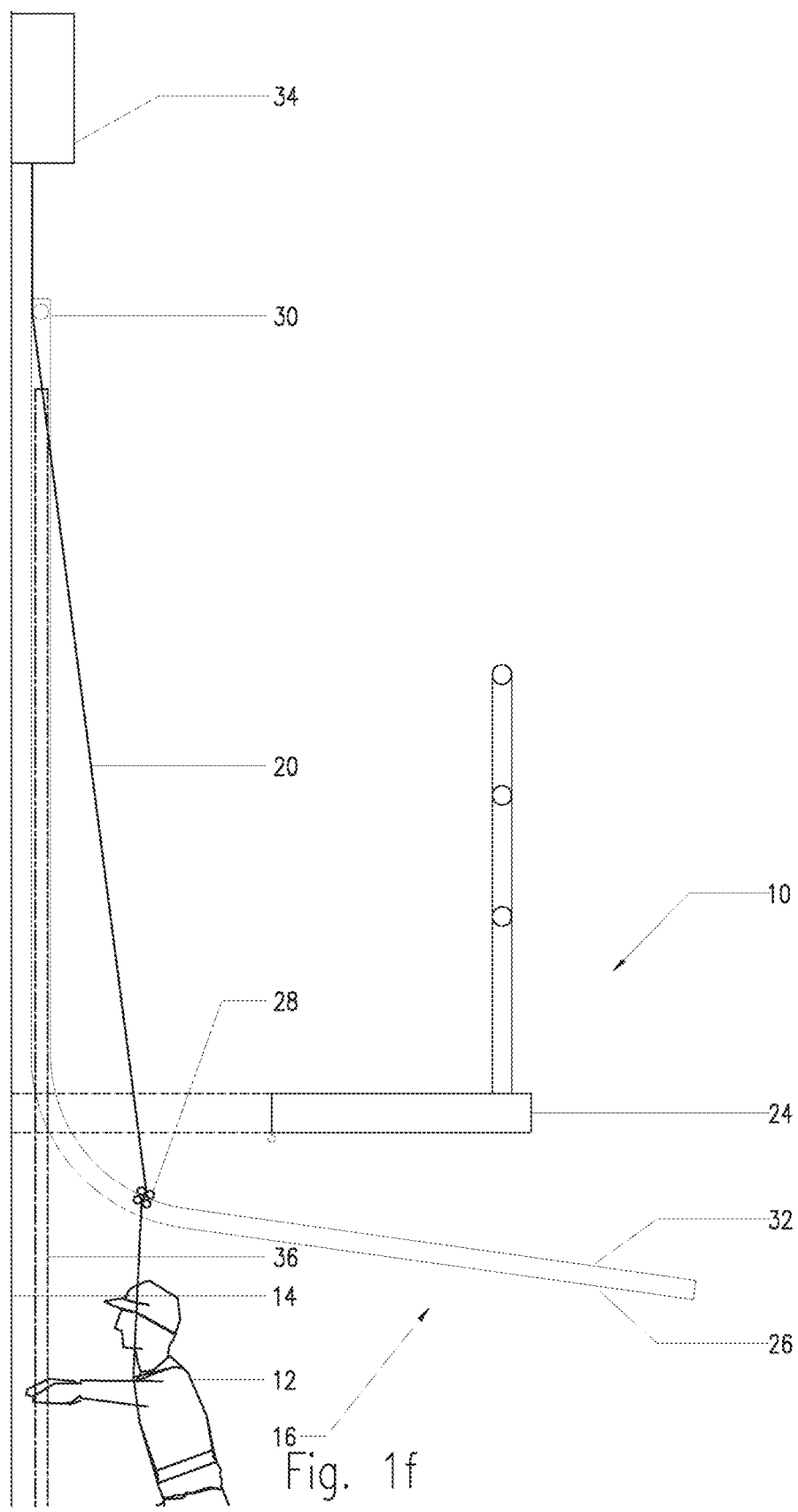
Figure 1G:
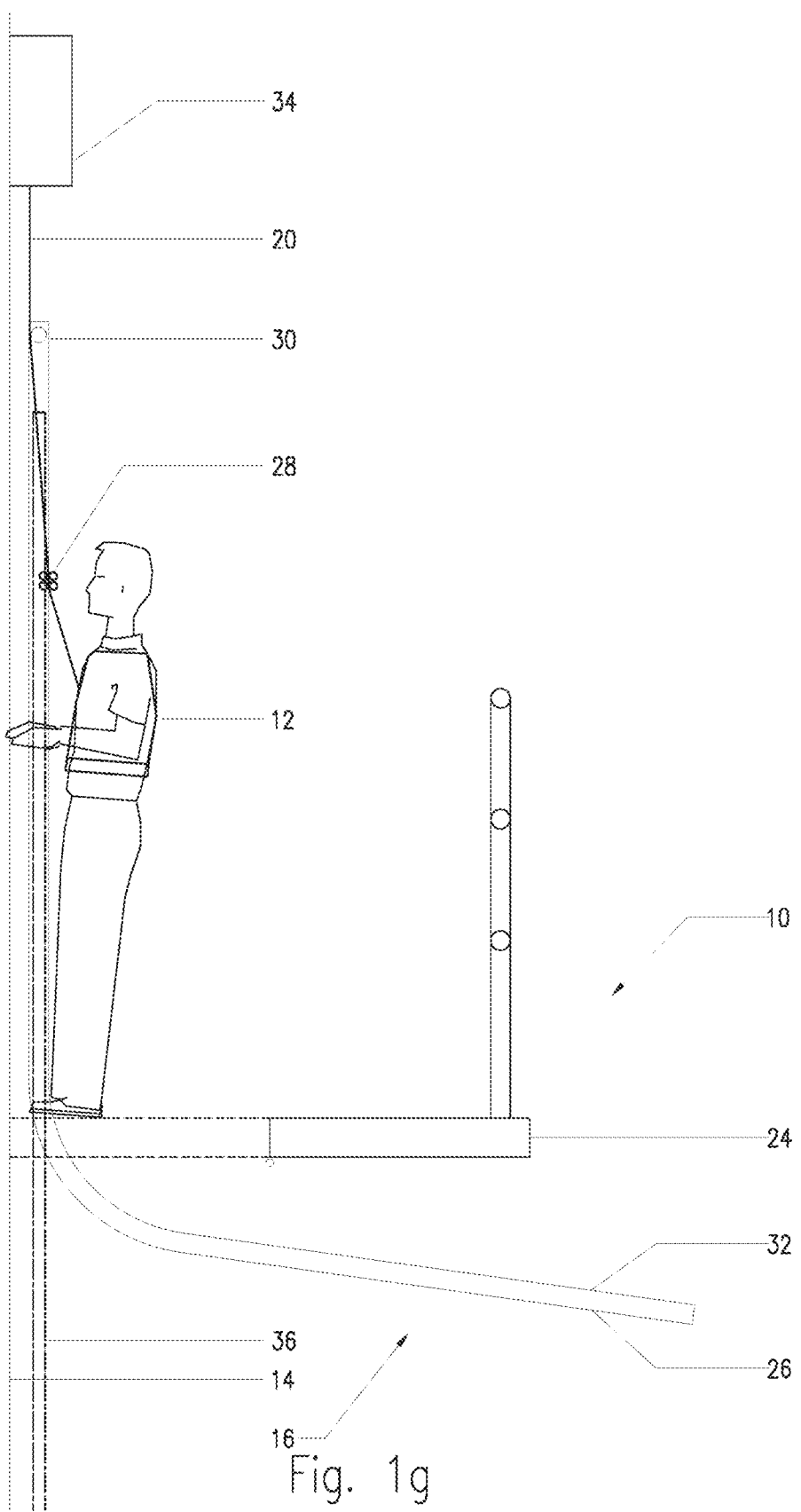

The preceding discussion of the background to the invention is intended only to facilitate an understanding of the present invention. It should be appreciated that the discussion is not an acknowledgement or admission that any of the material referred to was part of the common general knowledge as at the priority date of the application.

Throughout the description and claims of this specification, the words "comprise" and "contain" and variations of the words, for example "comprising" and "comprises", means "including but not limited to", and is not intended to (and does not) exclude other components, integers or steps.

Throughout the description and claims of this specification, the singular encompasses the plural unless the context otherwise requires. In particular, where the indefinite article is used, the specification is to be understood as contemplating plurality as well as singularity, unless the context requires otherwise.

Features, integers or characteristics, compounds described in conjunction with a particular aspect, embodiment or example of the invention are to be understood to be applicable to any other aspect, embodiment or example described herein unless incompatible therewith.

Referring to FIGS. 1a to 1g, a first embodiment of a marine transfer assembly 10 in accordance with the invention for transferring an object 12 from/to a marine transport vessel (not shown) to/from a construction or vessel 14 is shown.

The embodiment will be described with reference to the transfer of the object 12 from/to a marine transport vessel in the form of a pilot boat to/from an offshore wind turbine 14.

The assembly 10 comprises an apparatus for transferring said object 12 from/to the pilot boat; and a structure 16 adapted to extend from a side 18 of the turbine 14 to or from which said object 12 is to be transferred.

The apparatus comprises a motive force generator (not shown); a motive force applicator 20 operably linked to the motive force generator; and, in use of the apparatus, adapted to be operably linked to said object 12 to which the motive force applicator 20 applies a motive force; a fastening device 22 for operably linking the motive force applicator 20 to an object 12; a control mechanism formed and arranged so as to control the motive force generator and is operable to switch the operation of the motive force generator into an ascent or descent mode wherein the motive force generator acts upon the motive force applicator 20; and a measuring device operably linked to the control mechanism, said measuring device comprising one or more sensors and is adapted to determine a distance between said measuring device and at least one point on a surface of a marine transport vessel from or to which said object 12 is to be transferred.

The apparatus further comprises one or more safety protocols and a parameter sensing means in communication with the control mechanism. The control mechanism is responsive to feedback from the parameter sensing means and is adapted to initiate one or more of the safety protocols.

The motive force generator may comprise one or more of a powered winding reel, a hoist, a cable traction device, a capstan, a pulley, a counterweight device and/or a powered lifting device. In the embodiment shown, the motive force generator is in the form of a powered winding reel.

The winding reel comprises a centre shaft which is driven via a gearbox by an electric drive motor or servo-motor.

The winding reel, motor and gearbox are mounted within a housing 34 with said housing 34 installed on the wall 18 of the turbine 14. The housing 34 is sited on the wall 18 of the turbine 14 above the turbine work platform 24, with the motive force applicator 20 feeding downwards through an opening in the housing 34. In the embodiment shown, the housing 34 is sited about 3 meters above the work platform 24.

In the embodiment shown, the motive force applicator 20 is in the form of a rope. The rope 20 is attached to the winding reel at one end thereof and to the fastening device 22 at a distal portion along the rope 20. The rope 20 being, in use, attachable to said object 12 via the fastening device 22.

In the embodiment shown, the fastening device 22 comprises a carabiner, although it would be understood that fastening device 22 may be any fastening device suitable for attaching the rope 20 to the object 12.

The control mechanism comprises a haulage force application means, said haulage force application means is operable to apply a determined haulage force to the motive force applicator 20 by way of the motive force generator.

The control mechanism 21 is in the form of a control box and contains an electronic control and diagnostic system and an inverter, which controls the operation of the motor. The control box further contains the haulage force application means which is in the form of a haulage force applicator.

In use, the control box is operable to switch the operation of the winding reel into an ascent or descent mode wherein the winding reel acts upon the rope 20 and the haulage force applicator is operable to apply a determined haulage force to the rope 20 by way of the winding reel.

The parameter sensing means 23 is in the form of a parameter sensing unit or module, and comprises a load or distance sensing means in the form of a load cell, tension or distance measuring means, or other kind of sensor. In the embodiment shown, parameter sensing means 23 comprises a load sensing means in the form of a load sensor. The parameter sensing means further comprises one or more sensing 25 means or sensors for determining/monitoring one or more characteristics of certain features of the apparatus or external/environmental parameters. For example, the parameter sensing means 23 may further comprise a rotational counter and may comprise a temperature sensor to measure the temperature of the moving components.

In use, the load sensor detects the weight of the object 12 and the haulage force applicator determines the amount of haulage force to be exerted on the rope 20 by the winding reel. The maximum haulage force will be dependent on the maximum number and/or types of objects the apparatus is utilized to transfer. For example, if the apparatus is to be utilized to transfer only a user such as an engineer, the haulage force may preferably be up to a maximum of 300 kg equivalent.

The amount of haulage force (hf) applied will be derived by multiplying the applied assistance "a" required (as a percentage of the load detect) by the detected load "dl". Before activating the system, a user can pre-programme the level of applied assistance "a". If the applied assistance is 100% or less, then a climb assistance will be provided. If the applied assistance is over 100%, then the object will be hoisted without any ascent effort required by the object. Typically, the applied assistance during hoisting will be between 101% and 110%.

The measuring device determines the distance between itself and at least one point of the surface of the pilot boat for example at least one point of the deck from/to which the object 12 is to be transferred to/from either by calculating the distance based on measured parameters or measuring the distance directly by means of one of its sensors. In the embodiment shown, the measuring device is positioned at a distal end of the rope 20 proximate the carabiner 22.

The measuring device is further adapted to determine an amplitude and a modulation of the vertical movement of the marine transport vessel resulting from waves acting on the marine transport vessel and adapted to determine environmental conditions proximate the turbine 14. Said parameters may be measured or calculated by the measuring device.

In use, the control box is adapted to control the speed of the winding reel in response to the determined amplitude and modulation during the transfer process. The control box will control the speed of the winding reel to between 0.1 m/s and 5 m/s during said process.

In an assisted ascent mode, the load sensor is operable to detect a change in the load on the rope 20. If the load sensor detects a load substantially equal to the load detected by the load sensor on the rope 20, the control box is operable to initiate a safety protocol and switch the operation of the winding reel to a fall or descent mode, wherein the winding reel is stopped and the haulage force applicator ceases to apply the haulage force to the rope 20 by way of the winding reel and the object is maintained in position by the rope 20.

A safety protocol may optionally also be initiated to stop the winding reel where the parameter sensing means comprises the temperature sensor if the parameter sensing means detects that the winding reel temperature is above an acceptable level.

The structure 16 is in the form of a framework structure comprising a hoist rail 26 and a trolley 28 adapted to move along the rail 26.

In the embodiment shown, the rail 26 is L-shaped having a first section 30 fastened to the wall 18 of the turbine 14 and a second section 32 extending from the wall 18 at an incline.

The second section 32 extends outwardly from the wall 18 at a distance of about 5 to 8 meters.

The trolley 28 is operably linked to the rope 20 and is adapted to move the position of the carabiner 22 along the rail 26.

The transfer of an object 12 in the form of an engineer using the assembly 10 will now be described.

Firstly the pilot boat carrying the engineer 12 is driven against the turbine 14 and is maintained against the turbine 14 by the captain of the boat as is known in the art.

The engineer 12 then activates the control box via a remote control to actuate winding reel into a descent mode in order to lower the rope 20.

At initiation and during the lowering process, the measuring device, depending on the program setting, continuously or periodically determines the distance between the measuring device and the deck of the marine transport vessel.

As the rope 20 is lowered, the trolley 28 is released down the rail 26 until it reaches the end of the rail 26. At this point, as the rope 20 continues to be released from the winding reel, the carabiner 22 and the attached rope 20 is lowered to the boat below.

The lowering operation is either controlled by a remote control device held by the engineer 12 in the boat or automated.

As the carabiner 22 reaches the engineer 12, standing in the middle of the boat, the lowering process is halted and the engineer clips the carabiner 22 onto his harness. Where the lowering of the rope is automated, the control box will stop the winding reel lowering the rope when the carabiner 22 is at a predetermined distance relative to the deck of the boat as determined by the measuring device.

The engineer then switches the control box into an 'automatic retract' mode, whereupon the winding reel pulls the rope 22 tight and removes any slack in the rope.

The engineer 12 then moves forward to the bow of the boat in order to access the service ladder 36. As the engineer 12 moves forward to the bow of the boat, he is held safe by the rope 20, and the tension exerted by the winding reel on the rope 20 pulls the trolley 28 up the incline of the second section 32 of the rail 26.

The distance between the carabiner 22 and the deck is constantly monitored by the measuring device and communicated to the control box. The fall mode option of the safety protocol will be switched off and the fall-arrest function of the apparatus temporarily deactivated as the control box will know that the sudden movement of the engineer would not be fatal and will likely be due to a downward plunge of the boat.

Once the engineer 12 reaches the ladder 36, he switches the control box into an 'ascent assist' mode whereby the control box actuates the winding reel to apply the haulage force to the rope 20 in order to assist the engineer 12 up the ladder 36. Once the ascent assist mode is actuated, the fall mode is simultaneously re-activated.

The applied assistance a will be 100% or less in order to provide climb assistance to the engineer.

As the rope 20 is wound in, the trolley 28 will be pulled up the first section 30 of the rail 26, and the engineer 12 assisted up the ladder 36.

The assembly 10 allows an engineer 12 to clip onto the carabiner while in the centre of the boat allowing him to protect himself prior to moving to the bow of the boat. In addition, the climb assistance provided by the apparatus means that climbing up the ladder 36 is not very laborious.

An engineer wishing to transfer to the boat from the turbine 14 may either choose to be lowered from the work platform 24 alongside the ladder 36 or climb down the ladder 36.

If the engineer chooses to be lowered alongside the ladder 36, the control box will actuate the winding reel to unwind and lower the rope 20.

As the rope 20 is lowered, the measuring device monitors the distance between the carabiner 22 and the deck of the boat.

When the engineer has reached the deck, there will be a substantial reduction in the load on the rope 20 which will be sensed by the load sensor. Once this reduction is detected, the control box will deactivate the descent mode and switch off the fall-arrest functions. The winding reel will be steadily controlled by the control box such that it pays out or takes in the rope 20 due to subsequent vertical movement of the boat in order to maintain a set tension on the rope 20.

If the engineer chooses to climb down the ladder 36, on actuation of the descent mode the control box initiates a 'gauge rope dispense mode' wherein the length of rope 20 dispensed by the winding reel is calculated or measured. Any suitable means to determine the length of rope 20 dispensed by the winding reel may be employed.

The rotational counter is in the form of a of a drum revolution counter, and the drum revolution counter is activated when the control box initiates the gauge rope dispense mode. The drum revolution counter will count the number of revolutions the winding reel performs during the lowering operation and thus allow the control box to determine the length of rope 20 dispensed by the winding reel.

Prior to winding reel unwinding the rope 20 for the descent of the engineer, the measuring device will determine the distance between the carabiner 22 and the deck of the boat and communicate the distance to the control box.

The amplitude and modulation of the vertical movement of the boat is also determined by the measuring device and communicated to the control box.

The control box will compare the initially determined distance to the amount of rope 20 paid out from the winding reel as the engineer descends.

When the distance becomes 1 meter or less, the control box will deactivate the fall-arrest function safety protocol and the engineer could jump onto the boat or ride up and down with the movement of the vessel without being pulled off his feet.

Figure 2A:
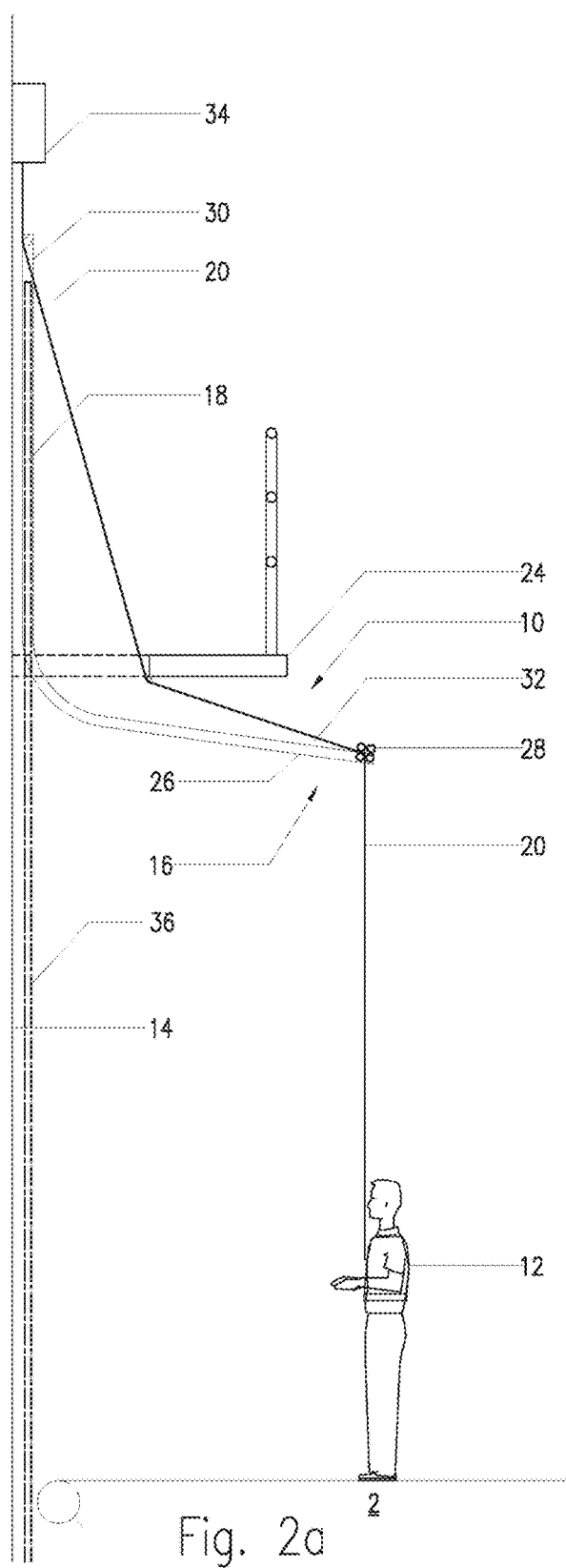
FIGS. 2a to 2c depict an alternative method of transferring an object utilizing the marine transfer assembly of FIGS. 1a to 1g.
Figure 2B:
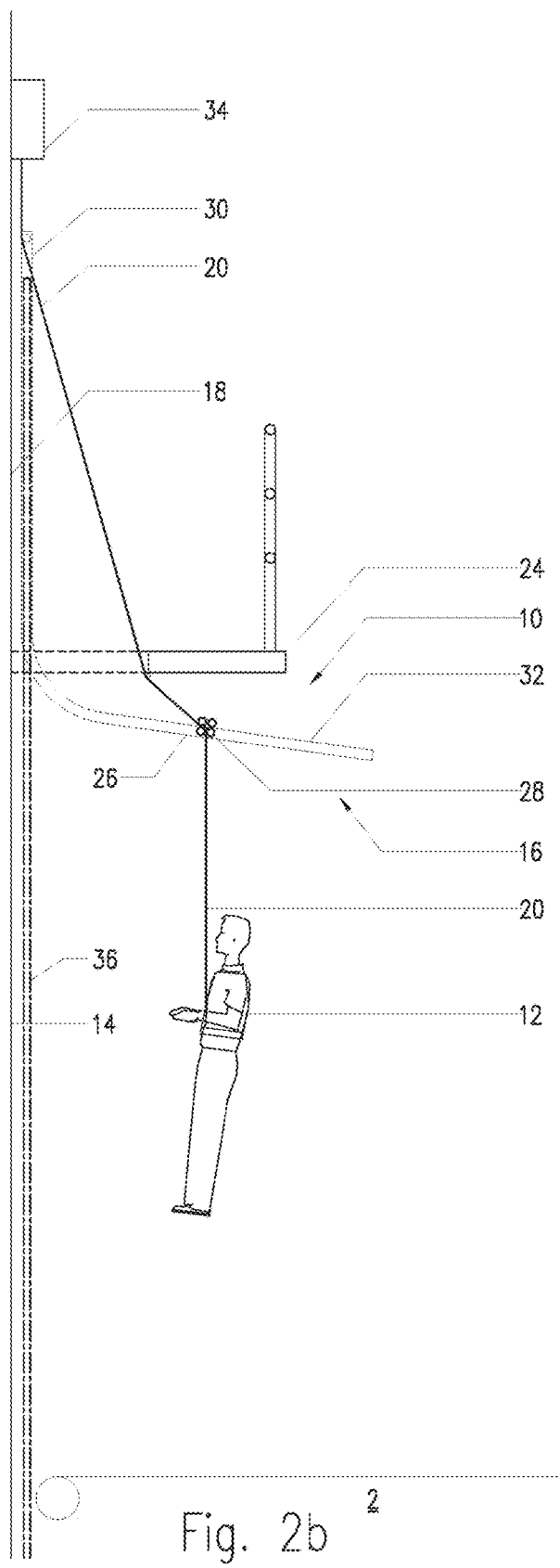
Figure 2C:
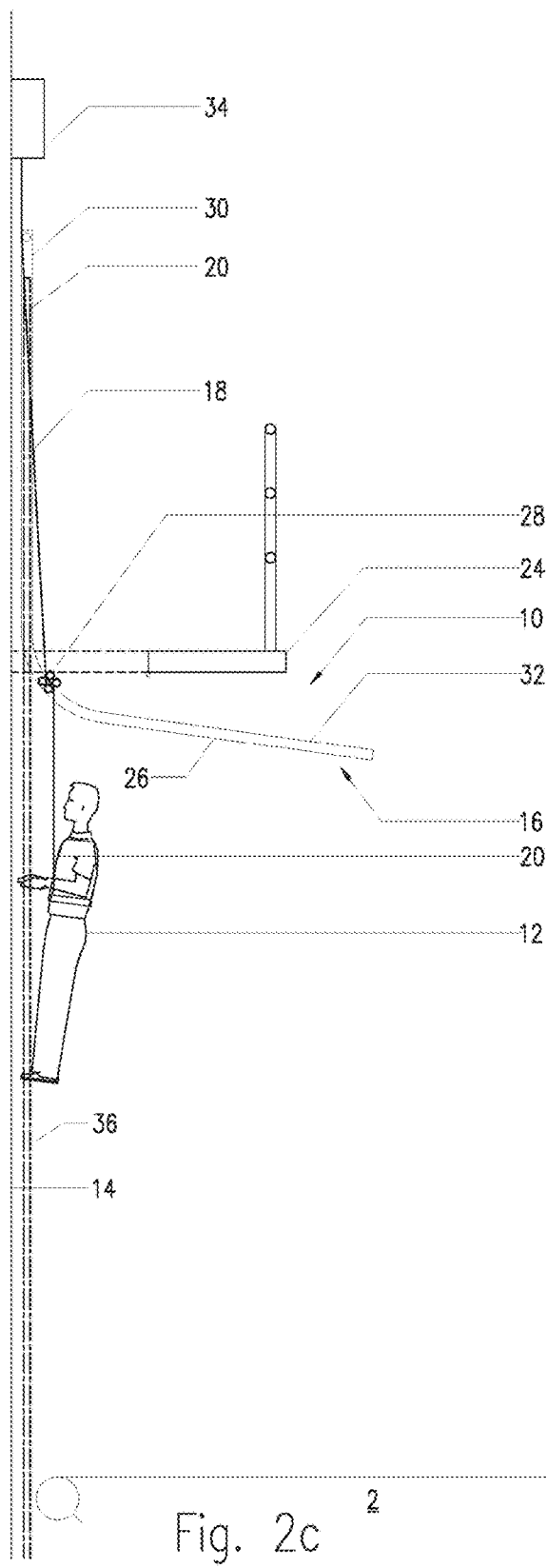

Referring to FIGS. 2a to 2c, an alternative method of transferring an object 12 in the form of an engineer using the assembly in accordance with the first embodiment of the invention is shown.

The method allows the engineer to be transported through the air to the ladder 36 from the vessel 2 without having to disembark via the vessel bow.

The lowering of the rope 20 from the winding reel is the same as described above.

The length of rope 20 wound off the winding reel is calculated via the rotation counter.

The load sensors monitor the load on the end of the rope 20 to confirm that either the full weight of the object 12 is experienced i.e. the object 12 is in mid-air, or that the weight measurement is much less, i.e. the object is on the surface of the vessel.

The distance between the surface of the vessel and winding reel is determined via the measuring device and will be confirmed or denied by the readings from the rotation counter and the load sensors.

When the object 12 is ready to be lifted or assisted off the deck of the vessel, the control box will obtain data from the measuring device which will identify the uplift and drop of the wave pattern. The load sensors will also provide data regarding the movement of the vessel on the waves, since the weight of the object 12 will vary as the vessel lifts and falls. The safety protocols compare the results from these different sources to identify conformity between them. If conformity is not obtained, a safety protocol will be initiated to prevent the winding of the winding reel.

If conformity is obtained, the winding reel will lift the engineer 12 into the air. It goes without saying that the applied assistance a will be greater than 100% in order to hoist the engineer 12.

The movement of the rope 20 is checked against a number of criteria determined by the direction of rotation of winding reel, for example acceptable winding speed etc.

As the rope 20 is wound in, the trolley 28 will be pulled along the second section 32 of the rail 26 towards the first section 30 of the rail, and the engineer 12 moved towards the ladder 36 (FIG. 2b).

On reaching the ladder 36, the engineer 12 may decided to be hoisted towards the platform 24 or reduce the applied assistance to less than 100% so as to climb the ladder towards the platform with or without climb assistance.

Referring to FIGS. 3a to 3f, a second embodiment of a marine transfer assembly 100 for transferring an object 112 from/to a marine transport vessel 102 to/from an offshore construction or vessel 114 is shown.

The embodiment will be described with reference to the transfer of the object 112 from/to a marine vessel in the form of a pilot boat 102 to/from an offshore wind turbine 114.

As in the previously described embodiment, the assembly 100 comprises an apparatus for transferring said object 112 from/to the pilot boat 102; and a structure 116 adapted to extend substantially from a side 118 of the turbine 114 to or from which said object 112 is to be transferred.

The apparatus for transferring said object 112 is similar to that previously described and as such will not be described in any further detail except for any differences to that previously described.

In this embodiment, rather than a framework structure, the structure 116 comprises a platform. The platform 116, in use, extends about 8 to 15 meters horizontally from the wall 118 of the turbine 114.

The platform 116 may be fixed or moveable between a first position and a second position. For example the platform 116 may be moveable between a retracted position wherein the platform 116 does not extend horizontally from the wall 118 and an transfer position wherein the platform 116 extends horizontally from the wall 118. Alternatively or in addition, the position of the platform 118 on the turbine 116 may be adjustable, that is to say that the height of the platform above the sea surface 138 may be varied.

It would be understood that the platform 116 may be a work platform of the turbine 114 and not a separate structure to the work platform.

The assembly 100 further comprises a pulley 140 operably linked to the winding reel; and a pivotable frame 142 attached to a distal end of said platform 116.

The frame 142 comprises two sidebars 144 pivotally mounted on said platform 116 and a crossbar 146 positioned between said sidebars.

The pulley 140 is mounted on the crossbar 146 of the pivotable frame 142.

In addition to the carabiner, the rope 120 comprises a measuring device 110 at a distal end thereof proximate the carabiner.

It is argued that as wave height and speed increase, the danger related to the arrangement of the delivery vessel jamming its bow against the turbine becomes greater. The dangers may either be to the engineer or to the boat itself. The assembly 100 according to the second embodiment makes it possible to bodily lift an engineer from the central deck of the boat 102 and hoist him up to the platform 116 attached to the turbine wall 118.

The transfer of an object 112 using the assembly 100 will now be described.

The pilot boat 102 will sail with a 'lifting carrier or basket' 104 on board towards the turbine 114. The carrier 104 will be able to accommodate one or more persons and will have the option of accommodating a person on a stretcher.

The carrier 104 is fitted with a flotation ring 106 and comprises a robust exterior to provide protection to passengers. The carrier further comprises an auxiliary measuring device (not shown) positioned on or proximate the base of the carrier 104. The auxiliary measuring device is operably linked to the control box.

The assembly 100 according to the second embodiment is designed to allow the engineer 112 to be delivered to the turbine 114 without the delivery boat having to make contact with the turbine structure 114.

When the turbine 114 is reached the captain will preferably turn his boat 102 into the wind. This will align the boat 102 towards the oncoming waves, allowing the bows to bear the thrust of the wave movement. The bows will act as a shock absorber, concentrating the movement of the boat 102 to the bow section and limiting the movement at the stern of the boat 102 where the access activities take place.

As the boat 102 approaches the turbine 114, a wireless controller on the boat 102 signals to the control box to actuate the winding reel to lower the rope 120 down towards the sea.

Prior to the lowering of the rope 120, the measuring device 110 determines an amplitude and a modulation of the vertical movement of the boat resulting from waves acting on the boat.

The determined amplitude and modulation is communicated to and imputed into control box. Once the data is received, the control box initiates the winding reel to actuate the rope 120 at a speed based on said determined amplitude and modulation.

The boat 102 will approach the turbine 114, taking station below the drop position under automatic or manual positioning control to hold it in position. Such positioning systems are commercially available. To function well they need to be fitted in vessels equipped with variable pitch propellers and fore and aft lateral thrusters.

Once in position, a distance between the measuring device and the deck of the boat 102 is measured by the measuring device 110. The measuring device 110 continuously monitors the distance and angle from the platform 116 and the carabiner to the boat 102 during the lowering process.

The measuring device 110 interacts with the control box operating the winding reel to stop the lowering process when the carabiner reaches a pre-set distance relative to the deck of the vessel 102.

The measuring device 110 which provides this functionality is equally capable of measuring the distance to the waves below the drop point and communicating with the control box to maintain the carabiner on the rope end at a predetermined distance above the swell by actuating the winding reel to take in and release the rope in time with the determined amplitude and modulation of the vertical movement of the boat 102 due to the waves.

With the boat 102 in place the deck crew will, using a wireless signal, lower the carabiner until it is held on board. The engineer 112 will then step into the carrier 104 and clip himself onto the framework.

The crew will connect the carabiner on the end of the rope 120 to the carrier 104. The remote control will be pressed to indicate that the engineer is ready for a lift. Meanwhile the boat 102 will be moving up and down on the waves, with a computer controlled positioning system keeping the boat 102 stationery in relation to the turbine 114.

The winding reel will take in and let out the rope 120, automatically maintaining a light tension to ensure that the carrier 104 does not lift off the deck and that the rope 120 does not form loops around the carrier 104 or any element of the vessel's equipment. The measuring device 110 will take constant readings of the distance from the boat 104 to the measuring device 110 and communicated said readings to the control box. These measurements will be analysed by a software programme in the control box to establish the wave patterns.

When a crest of a wave has been identified by the measuring device 110, the winding reel will wind in its rope at a calculated ascent assistance speed, thus lifting the carrier 104 and the engineer 112 off the deck as the wave and the boat 102 sink away below them. The winding reel will carry the engineer 112 to the level of the external platform 116 where he will disembark. The ascent assistance speed is calculated as a factor of the determined amplitude of the vertical movement of the boat 102 and control box is set to limit the ascent assistance speed to less than 4 m/s. For example, if the determined amplitude is 2 meters, the ascent assistance speed will be set to 2 m/s.

The carrier 104 will then be returned to the boat 102 to pick up further personnel or equipment.

The landing of the carrier 104 on the moving deck is the more difficult procedure and will now be described. Whether the carrier 104 is empty or full, the task of landing it onto the boat deck is the same.

The carrier 104 sits in its dock on the platform 116, supported by the rope 120 from the winding reel. When the signal is given from the remote control device, either on the boat 102 or from the carrier 104, the measuring device on the rope 120 and the auxiliary measuring device will both start to monitor the distance to the boat 102 as it moves up and down on the waves and from this data it will derive the frequency and height of the waves as well as the determined amplitude and modulation.

Over a period of time, typically 30 seconds, the measuring device and auxiliary measuring device will collect data to establish the prevailing wave pattern and communicate said data to the control box.

A maximum amplitude and modulation of the vertical movement of the boat 102 will have been defined as the safe limit for the transfer system. It is intended that this limit will be an amplitude of around 4 meters. The control box will determine whether the determined amplitude is within the safe limit and if it is, initiate the winding reel to lower the carrier 104.

The operation of the winding reel will be independent of the height of the tide.

Since the winding reel is capable of operation at a rate of up to 5 m/s, and the platform 116 will typically be approximately 20 meters above the waves, the theoretical time required to lower to the boat 102 will be only three to five seconds.

Having acquired this wave data, the control box actuates the winding reel to lower the carrier 104 to the predetermined distance above the level of the boat 102 carried on the highest wave. The auxiliary measuring device will help facilitate the determination of when said predetermined distance is reached. In this case, to one meter above the level of the boat 102 carried on the highest wave. When the measuring device and/or auxiliary measuring device identifies that the boat 102 has risen on the waves to a crest and theoretically to within 1 meter of the carrier 104, the control box will actuate the winding reel to lower the carrier 104 rapidly.

The winding reel will be capable of delivering rope movement significantly faster than the speed of the maximum wave rise or descent. As the boat 102 drops into the trough between waves, the carrier 104 follows the boat 102 down, landing on the deck before the base of the trough is reached.

Should the measuring device 110 and/or auxiliary measuring device detect that the boat 102 had started to rise before the carrier 104 has landed, the control box will reverse the rotation of the winding reel to lift the carrier 104 ahead of the ascending boat 102.

While moving downwards the winding reel will maintain a predetermined differential between the speed of the dropping boat 102 and the lowering speed of the carrier 104. The control box will operate the winding reel to try to maintain a lowering speed of 0.5 m/s faster than the descent of the boat 102. This differential will provide the 'landing speed'. If the carrier 104 does not land before the boat 102 starts to rise upon the next wave, the control box will try to maintain the winding reel speed at the same speed differential but this time to lift the carrier 104 at a speed that is 0.5 m/s slower than the speed of the rising boat 102 and the boat 102 will rise up to make contact with the carrier 104.

Upon landing on the deck, optional mechanical or magnetic clamps will hold the carrier 104 in place in a landing well on the boat 102. The carrier 104 will incorporate a shock absorption system to reduce the impact of a hard landing.

The control box will continue to ensure that the winding reel reels the rope 120 in and out in response to boat movement until either it is instructed to hoist the carrier 104 back up to the platform 116 to collect further personnel 112 or the carabiner is cast off the carrier 104 to allow the boat 102 to sail away from the turbine 114 along with its carrier 104.

While not specifically mentioned, the assembly in accordance with the second embodiment comprises the same safety protocols as the first embodiment.

In addition, while the assembly in accordance with the second embodiment has been described with the carrier further comprising an auxiliary measuring device positioned on or proximate the base of the carrier, the auxiliary measuring device may be positioned at a different location within the assembly.

In certain arrangements, the auxiliary measuring device may be omitted.

While the transfer of an object in embodiments of the invention has been described with the use of a single winding reel and rope, two or more winding reels and/or ropes may be employed to provide redundancy.

While the transfer of an object described above has been with reference to the transfer of a user or person such as an engineer, it would be understood that the object may comprise equipment, tools or other inanimate objects.

While the transfer of an object described above has been with reference to the transfer from/to a turbine structure, it would be understood that the invention can be applicable to the transfer from/to other structures. For example, the assembly would be capable of transferring personnel between vessels, for example between mother-ships and daughter craft, as well as between wind turbines and support vessels.

While the embodiments of the invention have been described with the measuring device positioned at a distal end of the rope proximate the carabiner, the measuring device may be positioned at an alternative location within the assembly, for example the measuring device may be housed with the winding reel etc.

The invention claimed is:

1. An apparatus for transferring personnel from or to a marine transport vessel and to or from a construction or vessel, comprising:
   a motive force generator;
   a motive force applicator operably linked to the motive force generator and adapted to be operably linked to the personnel to which the motive force applicator applies a motive force;
   a fastening device for operably linking the motive force applicator to the personnel;
   a control mechanism, said control mechanism being formed and arranged so as to control the motive force generator, and further operable to switch operation of the motive force generator into an ascent or descent mode, wherein the motive force generator acts upon the motive force applicator;
   a measuring device operably linked to the control mechanism, said measuring device comprising a sensor, and said measuring device adapted to determine a distance between said measuring device and at least one point of a surface of the marine transport vessel from or to which said personnel is to be transferred;
   wherein said apparatus comprises a load sensor, said control mechanism being in communication with said load sensor and responsive to feedback from said load sensor and said measuring device, wherein the control mechanism is adapted to selectively activate and deactivate a fall arrest mode of the apparatus in response to the feedback from at least one of the load sensor and the measuring device; and wherein the control mechanism comprises a haulage force applicator, said haulage force applicator operable to apply a determined haulage force to the motive force applicator by way of the motive force generator.

2. The apparatus according to claim 1, wherein the measuring device is further adapted to determine an amplitude and a modulation of a vertical movement of said marine transport vessel resulting from waves acting on said marine transport vessel.

3. The apparatus according to claim 2, wherein the control mechanism is adapted to control a speed of the motive force generator in response to the determined amplitude and modulation of the vertical movement of said marine transport vessel resulting from waves acting on said marine transport vessel.

4. The apparatus according to claim 1, wherein said measuring device is further adapted to determine environmental conditions proximate a construction or vessel to which said personnel is to be transferred to or from.

5. The apparatus according to claim 1, wherein the fastening device comprises a carabiner.

6. The apparatus according to claim 1, wherein said haulage force is determined in accordance with the equation hf equals dl multiplied by a, where: "hf" equals haulage force in kg; "dl" equals a load detected by the load sensor in kg; and "a" equals applied assistance as a percentage.

7. The apparatus according to claim 6, wherein the applied assistance "a" ranges from between 1% and 120%.

8. The apparatus according to claim 6, wherein the haulage force applicator is operable to determine the amount of haulage force applicable to a load in response to the detection of that load by the load sensor.

9. The apparatus according to claim 6, wherein when the apparatus is in an assisted ascent mode or a descent mode, the load sensor is operable to detect a change in the load on the motive force applicator.

10. The apparatus according to claim 1, wherein the control mechanism is adapted to control a speed of the motive force generator in response to the determined distance between said measuring device and a surface of the marine transport vessel.

11. The apparatus according to claim 10, wherein the speed of the motive force generator is controlled at a speed between 0.1 m/s and 5 m/s.

12. The apparatus according to claim 1, wherein the motive force generator is a powered winding reel and the motive force applicator is a rope, the rope being attached to the powered winding reel and attachable to said personnel via said fastening device.

13. A marine transfer assembly for transferring personnel from or to a marine transport vessel to or from a construction or vessel, said marine transfer assembly comprising:
an apparatus according to claim 1; and
a structure adapted to extend from a side of a construction or vessel to or from which said personnel is to be transferred.

14. The marine transfer assembly according to claim 13, wherein said structure comprises a framework structure.

15. The marine transfer assembly according to claim 14, wherein the structure comprises a hoist rail and a trolley adapted to move along said hoist rail.

16. The marine transfer assembly according to claim 15, wherein the trolley is operably linked to the motive force applicator and is adapted to move a position of the fastening device along said hoist rail.

17. The marine transfer assembly according to claim 14, wherein the framework structure extends about 0.4 to 8 meters horizontally from the construction or vessel.

18. The marine transfer assembly according to claim 13, wherein the structure comprises a platform.

19. The marine transfer assembly according to claim 18 further comprising:
a pulley operably linked to said motive force generator; and
a pivotable frame attached to a distal end of said platform.

20. The assembly according to claim 18, wherein the platform extends about 2 to 14 meters horizontally from the construction or vessel.

21. A method of transferring personnel from a marine transport vessel to a construction or vessel, said method comprising the steps of:
determining an amplitude and a modulation of a vertical movement of said marine transport vessel resulting from waves acting on said marine transport vessel;
imputing said determined amplitude and modulation into a control mechanism of an apparatus for providing ascent assistance to said personnel;
sensing a load using a load sensor in communication with the control mechanism, the load sensor being configured to provide feedback to the control mechanism;
communicating the sensed load to the control mechanism;
initiating a motive force generator of said apparatus to actuate a motive force applicator at a speed based on said determined amplitude and modulation;
lowering a fastening device connected to a distal end of the motive force applicator to a pre-set distance relative to a surface of said marine transport vessel;
attaching said fastening device to said personnel;
applying ascent assistance to said personnel at a speed based on said determined amplitude and modulation;
determining, by the control mechanism, whether to activate or deactivate a fall arrest mode in response to the feedback from at least one of the load sensor and the determined amplitude and modulation; and
wherein the control mechanism comprises a haulage force applicator, said haulage force applicator operable to apply a determined haulage force to the motive force applicator by way of the motive force generator.

22. The method according to claim 21, wherein ascent assistance to said personnel is initiated at a crest of a wave or proximate a crest of a wave.

23. The method according to claim 21, wherein ascent assistance is applied at a speed of 4 m/s or less.

24. The method according to claim 21, further comprising the step of providing ascent assistance to the personnel to lift the personnel to a ladder or a work platform on the construction or vessel.

* * * * *